(12) United States Patent  (10) Patent No.: US 8,618,925 B2
Petrucelli et al.  (45) Date of Patent: *Dec. 31, 2013

(54) TIRE PRESSURE MONITORING SYSTEM USING WIRELESS NETWORK

(75) Inventors: Steven Petrucelli, Cranbury, NJ (US); Mark Kuskovsky, Monroe Township, NJ (US)

(73) Assignee: Measurement, Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,789

(22) Filed: Jan. 17, 2012

(65) Prior Publication Data

US 2012/0176233 A1 Jul. 12, 2012

Related U.S. Application Data

(63) Continuation of application No. 12/842,968, filed on Jul. 23, 2010, now Pat. No. 8,098,146, which is a continuation-in-part of application No. 12/259,046, filed on Oct. 27, 2008, now Pat. No. 7,889,064.

(60) Provisional application No. 61/000,579, filed on Oct. 26, 2007, provisional application No. 61/229,261, filed on Jul. 28, 2009.

(51) Int. Cl.
  *B60C 23/00* (2006.01)
  *G08B 1/08* (2006.01)

(52) U.S. Cl.
  USPC ......... 340/442; 340/444; 340/447; 340/539.1

(58) Field of Classification Search
  None
  See application file for complete search history.

(56) References Cited

U.S. PATENT DOCUMENTS

| 4,748,845 A | 6/1988 | Rocco et al. |
| 4,827,764 A | 5/1989 | Hwang |
| 4,845,980 A | 7/1989 | Weng |

(Continued)

FOREIGN PATENT DOCUMENTS

| CA | 2351602 A1 | 12/2001 |
| DE | 19837550 A1 | 2/1999 |

(Continued)

OTHER PUBLICATIONS

European Search Report dated Nov. 18, 2012 for related application No. GB1012703.3.

(Continued)

*Primary Examiner* — Julie Lieu
(74) *Attorney, Agent, or Firm* — Howard IP Law Group, PC

(57) ABSTRACT

A tire pressure monitoring using wireless network includes a remote command device and a valve-stem mountable tire pressure gauge. The tire pressure gauge includes a pressure sensor for detecting a pressure of a fluid in a tire and providing an output signal indicative of the detected fluid pressure, and a first radio-frequency module for transmitting data indicative of the detected fluid pressure based on the output signal of the pressure sensor. The remote command device includes a second radio-frequency module for wirelessly receiving the data transmitted by the data transmitted by the first radio frequency module, a wireless communication module for communicating via a wireless network, information based at least one data received by the second radio frequency module, and a display for displaying at least the fluid pressure detected by the pressure sensor.

8 Claims, 22 Drawing Sheets

(56) References Cited

U.S. PATENT DOCUMENTS

| | | |
|---|---|---|
| 4,890,090 A | 12/1989 | Ballyns |
| 4,916,944 A | 4/1990 | Ho-Chuan |
| 4,924,697 A | 5/1990 | Hunt et al. |
| 4,975,679 A | 12/1990 | Ballyns |
| 4,998,438 A | 3/1991 | Martin |
| 5,033,296 A | 7/1991 | Huang |
| 5,055,826 A | 10/1991 | Ballyns |
| 5,117,684 A | 6/1992 | Hwang |
| D366,845 S | 2/1996 | Handfield et al. |
| D366,846 S | 2/1996 | Handfield et al. |
| D390,140 S | 2/1998 | Germanton |
| D395,835 S | 7/1998 | Okuyama et al. |
| D409,509 S | 5/1999 | Petrucelli et al. |
| D409,931 S | 5/1999 | Petrucelli et al. |
| D427,092 S | 6/2000 | Wu |
| D427,093 S | 6/2000 | Wu |
| D440,893 S | 4/2001 | Van Zeyl |
| D440,894 S | 4/2001 | Van Zeyl |
| D440,895 S | 4/2001 | Van Zeyl |
| D441,674 S | 5/2001 | Van Zeyl |
| D447,970 S | 9/2001 | Cappiello et al. |
| D450,257 S | 11/2001 | Bressler et al. |
| D455,361 S | 4/2002 | Super et al. |
| D455,666 S | 4/2002 | Cappiello et al. |
| D459,257 S | 6/2002 | Petrucelli |
| D459,668 S | 7/2002 | Petrucelli |
| D462,627 S | 9/2002 | Petrucelli |
| D469,706 S | 2/2003 | Huang |
| D474,124 S | 5/2003 | Krieger et al. |
| D488,082 S | 4/2004 | Durr et al. |
| D491,480 S | 6/2004 | Huang et al. |
| D492,608 S | 7/2004 | Fujioka |
| D496,602 S | 9/2004 | Shipman |
| D498,154 S | 11/2004 | Wang |
| 6,817,235 B2 | 11/2004 | Sapir |
| 6,825,758 B1 * | 11/2004 | Laitsaari ................. 340/442 |
| D501,146 S | 1/2005 | Durr et al. |
| 6,838,983 B1 | 1/2005 | Wong |
| D501,418 S | 2/2005 | Wang |
| 6,856,245 B2 * | 2/2005 | Smith et al. ................. 340/442 |
| D503,898 S | 4/2005 | Durr et al. |
| D504,630 S | 5/2005 | Wang |
| D505,088 S | 5/2005 | Durr et al. |
| D505,871 S | 6/2005 | Little et al. |
| D505,872 S | 6/2005 | Durr et al. |
| D506,154 S | 6/2005 | Cowan et al. |
| 7,013,722 B2 | 3/2006 | Little et al. |
| 7,040,153 B2 | 5/2006 | Kroll et al. |
| 7,185,533 B2 | 3/2007 | Lee et al. |
| 7,212,105 B2 * | 5/2007 | Okubo ................. 340/447 |
| 7,250,852 B1 | 7/2007 | Kell |
| 7,383,724 B2 | 6/2008 | Petrucelli |
| 7,394,357 B2 * | 7/2008 | Kurata ................. 340/447 |
| 7,504,934 B2 | 3/2009 | Naito |
| 7,607,346 B1 | 10/2009 | Oboza et al. |
| 7,667,583 B2 | 2/2010 | Petrucelli |
| 7,737,835 B2 * | 6/2010 | Kyllmann et al. ........... 340/442 |
| 7,741,963 B2 * | 6/2010 | Tsai ................. 340/442 |
| 7,789,112 B1 | 9/2010 | Wise |
| 2004/0164854 A1 * | 8/2004 | Nantz et al. ................. 340/443 |
| 2005/0103108 A1 | 5/2005 | Little et al. |
| 2005/0138999 A1 | 6/2005 | Petrucelli |
| 2005/0229691 A1 * | 10/2005 | Shaw et al. ................. 73/146 |
| 2006/0055522 A1 * | 3/2006 | Rimkus et al. ............. 340/442 |
| 2006/0250227 A1 * | 11/2006 | Naito ................. 340/447 |
| 2007/0085668 A1 * | 4/2007 | Katou et al. ............. 340/447 |
| 2007/0210905 A1 * | 9/2007 | Battista ................. 340/447 |
| 2007/0222568 A1 * | 9/2007 | Morar et al. ............. 340/447 |
| 2008/0272906 A1 * | 11/2008 | Breed ................. 340/539.11 |
| 2008/0278309 A1 * | 11/2008 | Troxler ................. 340/539.1 |
| 2009/0135000 A1 * | 5/2009 | Twitchell, Jr. ............. 340/539.1 |
| 2009/0306848 A1 * | 12/2009 | Kohsaka et al. ............. 701/33 |
| 2009/0315697 A1 | 12/2009 | Huang |
| 2010/0073155 A1 * | 3/2010 | Chen ................. 340/439 |
| 2010/0127845 A1 * | 5/2010 | Hardman et al. ......... 340/447 |
| 2010/0271191 A1 * | 10/2010 | de Graff et al. ........... 340/447 |
| 2010/0283594 A1 * | 11/2010 | Li ................. 340/447 |

FOREIGN PATENT DOCUMENTS

| | | |
|---|---|---|
| EP | 1816014 A2 | 8/2007 |
| GB | 2169411 A | 7/1986 |
| GB | 2171548 A | 8/1986 |
| GB | 2429294 A | 2/2007 |
| WO | 9607568 | 3/1996 |
| WO | 2007095199 A2 | 8/2007 |
| WO | 2007112630 A1 | 10/2007 |

OTHER PUBLICATIONS

Canadian Office Action dated Oct. 2, 2012 for related Canadian Application No. 2,711,328.

* cited by examiner

TIRE PRESSURE MONITORING SYSTEM USING WIRELESS NETWORK

REFERENCE TO CROSS-RELATED APPLICATIONS

This application is a continuation of and claims the benefit of U.S. patent application Ser. No. 12/842,968, entitled "TIRE PRESSURE MONITORING SYSTEM USING WIRELESS NETWORK" and filed on Jul. 23, 2010, which is a continuation-in-part of and claims benefit of U.S. patent application Ser. No. 12/259,046, entitled "COMBINED TIRE PRESSURE GAUGE AND REMOTE TIRE PRESSURE DISPLAY" and filed on Oct. 27, 2008, now U.S. Pat. No. 7,889,064, issued Feb. 15, 2011, which application claims benefit of U.S. Provisional Patent Application No. 61/000,579, filed on Oct. 26, 2007, all of which applications are hereby incorporated by reference herein in their entireties. This application also claims the benefit of U.S. Provisional Patent Application No. 61/229,261, entitled "TIRE PRESSURE MONITORING SYSTEM USING WIRELESS NETWORK" and filed Jul. 28, 2009, which application is hereby incorporated by reference herein in its entirety.

FIELD OF INVENTION

The present invention relates to pressure measurement and pressure gauges and particularly to tire pressure monitoring systems.

BACKGROUND

Pressure gauges are conventionally used for measuring the pressure of a gas or a liquid, such as an air pressure. Tire pressure gauges, as an example, measure the inflation pressures of vehicle tires, such information being useful for maintaining optimal tire performance and avoiding unnecessary wear. Conventional tire pressure gauges are held in the hand, and require the user to locate a tire valve, unscrew a cap from the valve, and engage the tire pressure gauge with the valve. At night, it is difficult to locate the valve. Tire valve caps are usually covered in a film of dirt, which comes off on the user's fingers when removing and replacing the cap. While some vehicles have systems for monitoring of tire pressure using tire pressure gauges with radio-frequency transmitters pre-installed in the tires, and systems for interrogating the gauges and receiving readings installed in the vehicle, such systems have significant drawbacks including multiple, integrated components, complicated installation and operating procedures and impractical retrofitting on existing vehicles. Alternate tire pressure measurement and monitoring systems are, therefore, desirable.

SUMMARY OF THE INVENTION

A tire pressure monitoring system using wireless network includes a remote command device and a valve-stem mounted tire pressure gauge. The tire pressure gauge includes a pressure gauge, a first radio-frequency (RF) module and a motion sensor. The remote command device includes a second RF module, a wireless communication module, an accelerometer and a display. The command device is adapted to wirelessly communicate with a telecommunication device via a wireless network. The command device is adapted to transmit alerts to a registered telecommunication device based on occurrence of predetermined events. The command device is also adapted to receive requests from one or more registered telecommunication devices and responsive to the requests, transmit the requested information.

In an exemplary embodiment, the remote command device is adapted to transmit an alert to a pre-registered telecommunication device if the motion sensor of tire pressure gauge senses any motion of the tire associated with the pressure gauge. In another exemplary embodiment, the remote command device is adapted to transmit an alert to a pre-registered telecommunication device if the accelerometer senses any acceleration above a pre-set threshold.

A tire pressure monitoring system includes a valve-stem mountable tire pressure gauge and a remote command device. The pressure gauge includes a pressure sensor adapted for coupling to a tire and for detecting a pressure of the fluid in the tire. The pressure sensor provides an output signal indicative of the detected fluid pressure in the tire. The pressure gauge further includes a first radio-frequency module for transmitting data indicative of the detected fluid pressure based on the output signal of the pressure sensor. The remote command device includes a second radio-frequency module adapted for at least wirelessly receiving the data transmitted by the first radio-frequency module and a wireless communication module adapted for communicating with a telecommunication device via a wireless network. The wireless communication module transmits a communication based at least on the data received by the second radio frequency module. The command device further includes a display for displaying at least the fluid pressure detected by the pressure sensor.

According to an embodiment of the invention, a method for monitoring tire pressure includes the step of wirelessly receiving, at a remote command device, a first signal from a removable valve stem mounted tire pressure gauge. The first signal is indicative of at least a detected automobile tire pressure. Responsive to the received first signal, the method further includes a step of transmitting a first alert from the remote command device to a telecommunication device via a wireless network. The first alert is indicative at least of the detected automobile tire pressure.

According to an embodiment of the invention, a tire pressure monitoring system for an automobile includes a plurality of tire valve stem-mountable pressure gauges and a remote command device. Each of the plurality of the gauges is adapted to be associated with a predetermined tire of the automobile and includes a pressure sensor and a radio-frequency module. The remote command device includes a second radio-frequency module adapted to be in communication of the radio-frequency module of each of the pressure gauges. The command device further includes a device adapted to display alpha-numeric and graphical symbols. The command device is adapted to receive a removable wireless communication module adapted to be in communication with a telecommunication device via a wireless network.

BRIEF DESCRIPTION OF THE DRAWINGS

Understanding of the present invention will be facilitated by consideration of the following detailed description of the exemplary embodiments of the present invention taken in conjunction with the accompanying drawings, in which like numerals refer to like parts and in which.

DETAILED DESCRIPTION

It is to be understood that the figures and descriptions of the present invention have been simplified to illustrate elements that are relevant for a clear understanding of the present invention, while eliminating, for purposes of clarity, many other elements found in typical tire pressure gauges and tire pressure measurement and monitoring systems. However, because such elements are well known in the art, and because they do not facilitate a better understanding of the present invention, a discussion of such elements is not provided herein. The disclosure herein is directed to all such variations and modifications known to those skilled in the art.

Further, it should be understood that the several views of the housings, displays and general configurations shown in the figures include many decorative or ornamental features, aspects of which the particulars may be changed while maintaining the device's utility and without departing from the scope and spirit of the present invention.

Figure 1:
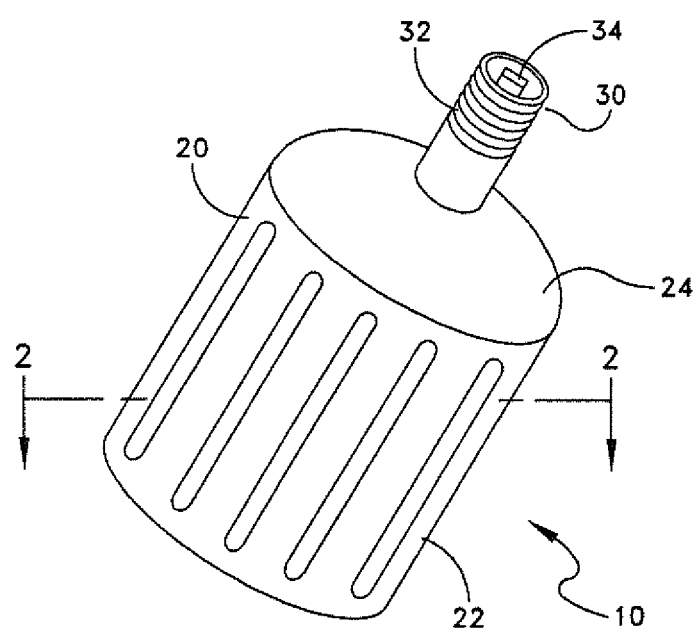
FIG. 1 is a is an exterior isometric view of a tire pressure gauge according to an embodiment of the present invention.

Referring to FIG. 1, tire pressure gauge 10 has a wall 20, which includes a cylindrical sidewall 22, a top wall 24, as well as a planar bottom wall, not shown in FIG. 1. Wall 20 defines an interior chamber, described below. Port 30 in wall 20 is provided, and includes a passage which communicates with and is open into the interior chamber, which passage may be closed by a valve (not shown in FIG. 1), such as a bleeder or pin valve. Port 30 is adapted to be attached to a nozzle of a conventional air hose, and has a threaded cylindrical outer surface 32 adapted to mate with a correspondingly threaded boss in a nozzle of such an air hose. Port 30 has a central rod or needle 34 which, when engaged, such as by a central pin in a nozzle of an air hose, opens a bleeder or pin valve associated with port 30, thereby allowing a fluid, for example, air, to flow from the air hose to chamber 21 and from chamber 21 to a port 40.

Figure 2:
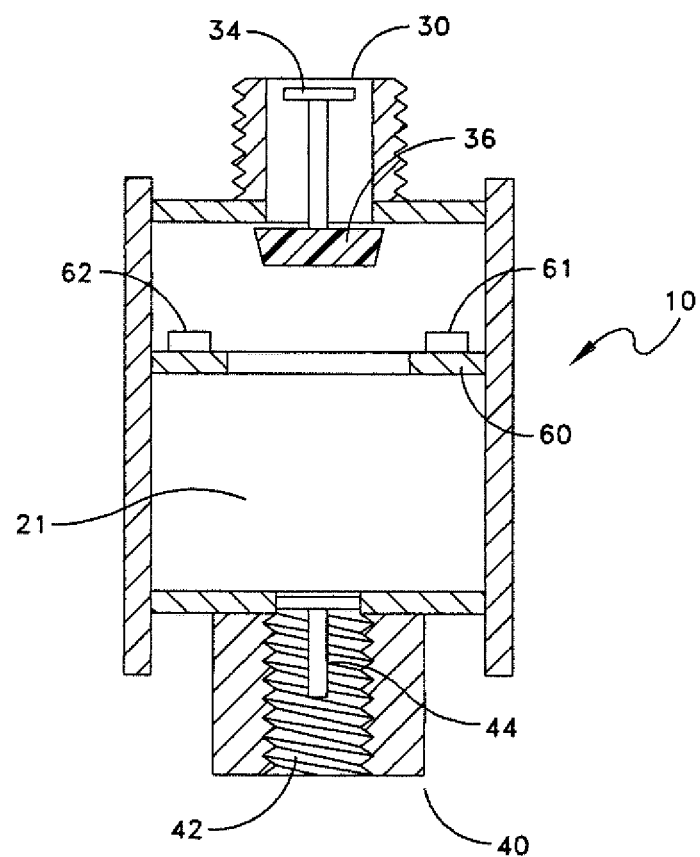
FIG. 2 is a cross-section, taken along line 2-2 of FIG. 1, of the tire pressure gauge of FIG. 1.

Referring now to FIG. 2, there is shown a cross-section, taken along line 2-2, of the tire pressure gauge 10 of FIG. 1. Chamber 21 defined within wall 20 can be seen. Chamber 21 has openings only at port 30 and port 40, and is otherwise sealed. At port 30, a pin valve 34 is provided to selectively seal port 30. Port 40 is adapted to engage with and open the needle valve on a suitable tire valve stem. Port 40 is preferably adapted to engage with and open the needle valve on a conventional tire valve stem, so that the conventional tire valve stem requires no modification for installation of a device in accordance with the invention. A tire valve stem is typically in the form of a tube, threaded on the exterior near the end thereof, to permit attachment of a protective cap, and having a valve, referred to variously as a pin valve, bleeder valve, or Schrader valve. This type of valve is kept normally closed by a combination of air pressure and a spring urging a stopper into contact with an opening. A pin extending out of the valve may be urged inward, such as by a piston in a nozzle of a service station air hose, to open the valve to permit the introduction of pressurized air into the tire.

Port 40 has a threaded boss 42 adapted to sealingly engage with a threaded tire valve stem. Pin 44 within boss 42 is adapted to open a needle valve on a valve stem when port 40 is in engagement with a suitable valve stem. PCB 60 is interior to chamber 21 and has thereon devices indicated generally at 61, 62, Devices 61, 62 may take the form of one or more of a pressure sensor, a temperature sensor or a motion sensor, by way of non-limiting examples only. Port 30 has pin valve 34 including a stopper 36 that is normally closed by pressure within chamber 21, or may be spring loaded. Pin 34 is coupled to stopper 36 so that urging of pin 34 toward chamber 21 causes stopper 36 to disengage and permit air to move between chamber 21 and the interior of port 30. Thus, with gauge 10 affixed or mounted to a valve stem of a tire, the tire may be pressurized by engaging the nozzle of a service station air hose with port 30.

Figure 3:
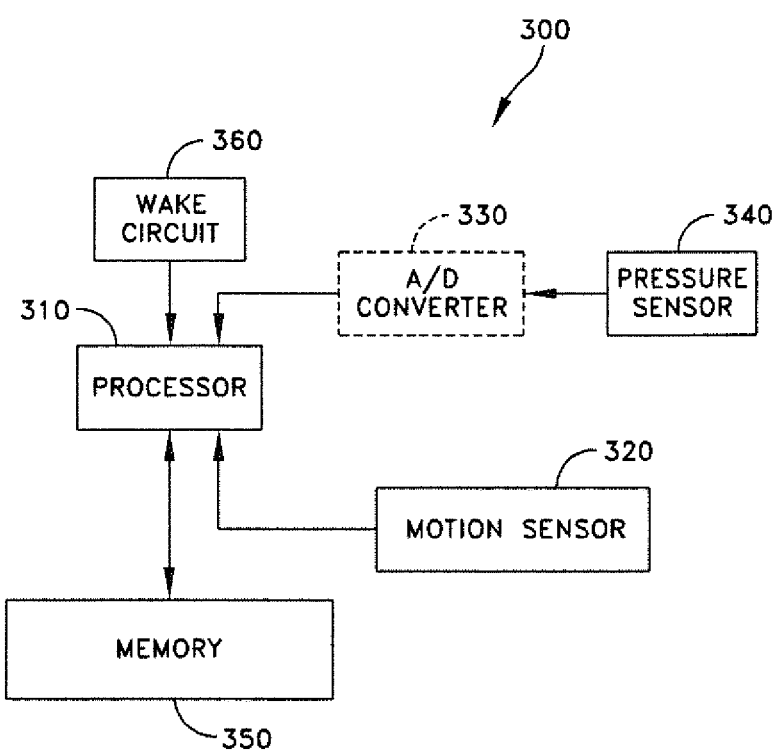
FIG. 3 is a is a block diagram of components of the tire pressure gauge of FIG. 1.

As set forth above, gauge 10 includes a pressure sensor located within wall 20 defining chamber 21. Referring now also to FIG. 3, there is shown a block diagrammatic view of an arrangement 300 suitable for use within chamber 21 of FIGS. 1 and 2. An exemplary arrangement 300 generally includes a processor 310, an optional analog to digital converter 330, a pressure sensor 340 and a motion sensor 320.

"Processor", as used herein, generally refers to a circuit arrangement that may be contained on one or more silicon chips, and/or integrated circuit (IC) boards, and that contains a Central Processing Unit (CPU). The CPU may generally include an arithmetic logic unit (ALU), which performs arithmetic and logical operations, and a control unit, which extracts instructions from memory and decodes and executes them, calling on the ALU when necessary.

Processor 310 may take the form of a microprocessor, and may be a low power CMOS processor with an embedded analog to digital converter, by way of non-limiting example only. Processor 310 may include multiple inputs and outputs. In the exemplary configuration illustrated in FIG. 3, processor 310 has an input coupled to a wake circuit 360. Processor 310 may also be coupled to a memory 350 to allow it to access its data contents. Processor 310 may have an input coupled to pressure sensor 340 optionally via analog-to-digital converter (A/D) 330. For example, where pressure sensor 340 provides an analog output signal indicative of a pressure sensed using port 30, A/D converter 330 may communicate a digital signal indicative of the analog signal output from pressure sensor 340 to processor 310. Where pressure sensor 340 provides a digital signal directly, A/D converter 330 may optionally be omitted. Also, where processor 310 is adapted to receive analog signals output from pressure sensor 340 directly, A/D converter 330 may optionally be omitted. A/D converter 330 may be selected based upon size limitations of chamber 21, an expected output from pressure sensor 340, expected input for processor 310 and available power sources (not shown) for device 10 (such as one or more batteries contained within chamber 21), for example.

Pressure sensor 340 may be any one of a number of conventional sensors for detecting fluid pressure, and particularly air pressure, and selected to provide acceptable response over a range of pressures anticipated in a particular application. By way of example, pressure sensor 340 may incorporate a MEMS based pressure die.

Figure 4A:
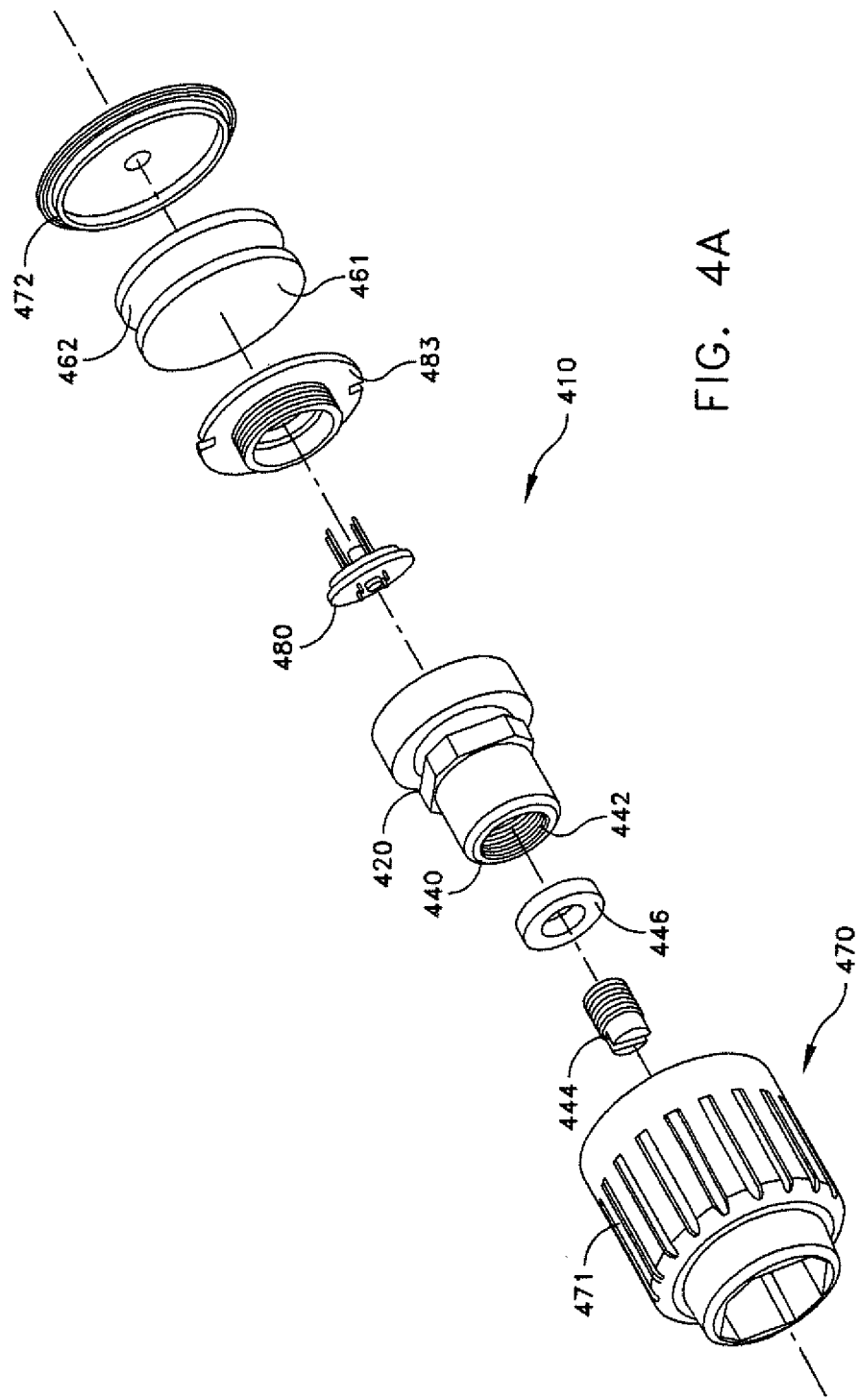
FIG. 4A is an exploded view of a tire pressure gauge in accordance with an alternative embodiment of the invention.
Figure 4B:
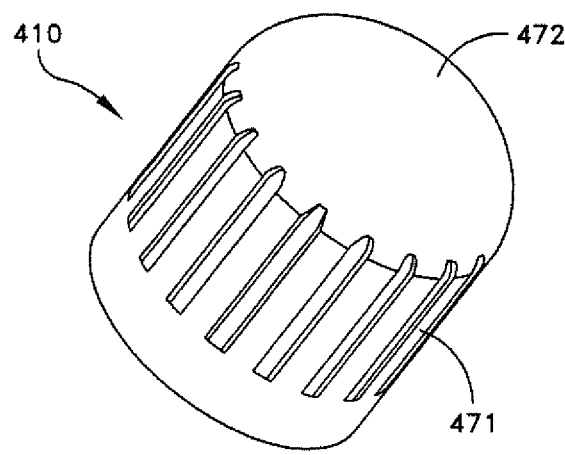
FIG. 4B is a view of the tire pressure gauge of FIG. 4A as assembled.

FIG. 4A is an exploded view of a tire pressure gauge 410 according to another embodiment of the invention, and FIG. 4B is a view of tire pressure gauge 410 when assembled. Tire pressure gauge 410 has a single port for receiving pressurized air from a tire valve stem, but does not have an additional port for receiving pressurized air from, for example, an air pump. The pressure gauge 410 may include a device for receiving power wirelessly. By way of example, tire pressure gauge 410 may include one or more radio frequency antennas, such as those used in radiofrequency identification tags (RFIDs). When interrogated by a source of RF radiation at the proper frequency, such an antenna generates a current which may be used variously, directly by, for example, a processor and a display for power, or be provided to a battery or capacitor for storage and discharge of current to power, for example, a processor and a display. A user may have a handheld or a remote unit that serves as a source of RF radiation at the proper frequency.

Outer housing 470 may be substantially cylindrical, and may have two pieces, namely a body portion 471 open at both ends and a cap 472 that closes a distal opening of body portion 471. Inner housing 420 defines a chamber having an opening, when the tire gauge is fully assembled, only at port 440, and is otherwise sealed. Port 440 is adapted to engage with and open the needle valve on a suitable tire valve stem. Port 440 has a threaded boss 442 adapted to sealingly engage with a threaded tire valve stem. Piston 444 within boss 442 is adapted to open a needle valve on a valve stem when port 440 is in sealing engagement with a suitable valve stem. PCBs 461, 462 are mounted exterior to the chamber and within outer housing 470, and may carry thereon devices such as an RF antenna, battery, capacitor, processor, and wake up circuit. A pressure sensing die 480 is positioned at an end of the chamber and bolt 483, and seals the corresponding opening in inner housing 420.

Figure 5:
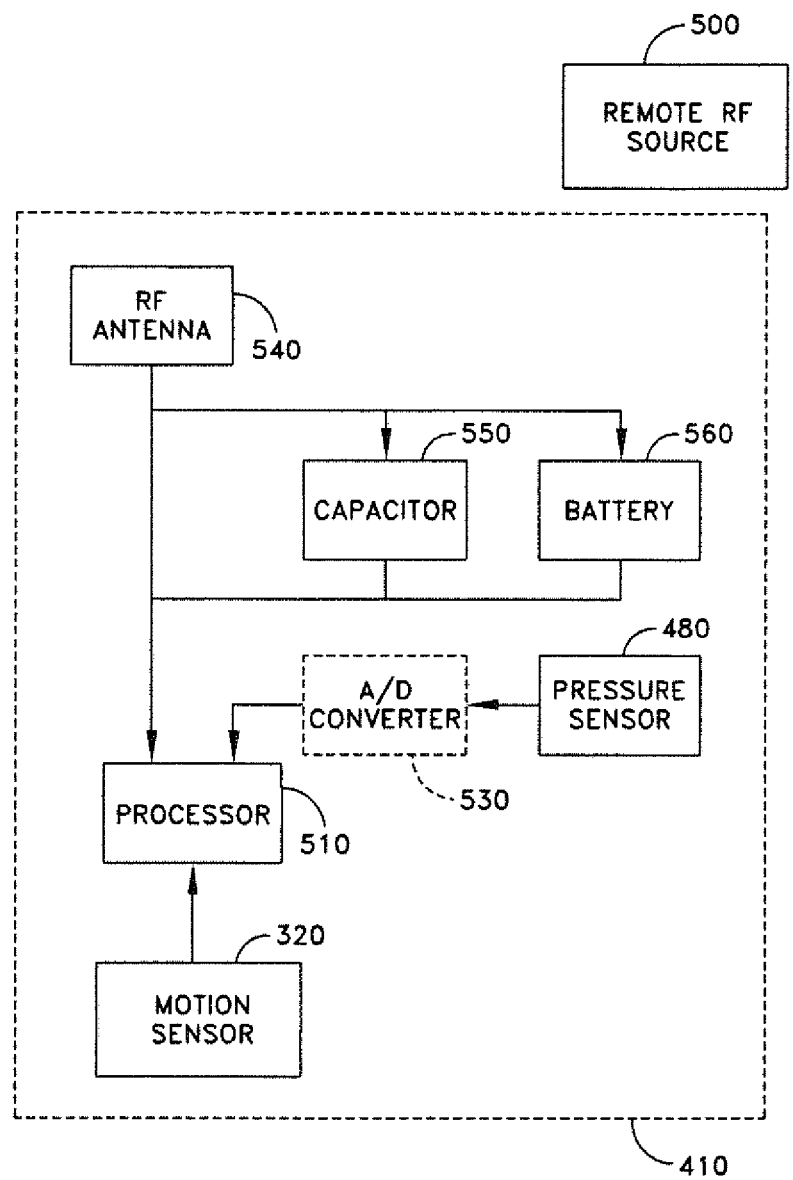
FIG. 5 is a block diagram of components in a tire pressure gauge in accordance with the embodiment of FIG. 4A together with an RF source.

Referring now to FIG. 5, a block diagram of tire gauge 410, in a system together with a remote RF source 500, is illustrated. Remote RF source 500 may include an RF antenna, a power source, such as a battery, and a manually operated on/off switch. In use, the user places the handheld or remote RF source 500 in proximity to device 410, according to an embodiment of the invention. The distance between handheld or remote RF source 500 and tire gauge 410 at which device 410 will operate may be, in some embodiments, at least about three to four feet, so that a user may stand next to the vehicle, holding the handheld or remote RF source 500 in the hand, and activate device 410 by activating handheld or remote RF source 500, without the need to stoop or lean to bring handheld or remote RF source closer than three or four feet from device 410. The distance may be greater in some embodiments, by way of example, sufficiently long that remote RF source 500 may be located on or in a dashboard of the vehicle. When RF radiation from remote RF source 500 is received by RF antenna 540, a current is produced by RF antenna 540. The current may be provided directly to processor 510, or to a capacitor 550 which then supplies a current to processor 510, or to battery 560, which then supplies a current to processor 510. It will be understood that a suitable voltage is also furnished to pressure sensor 480, and optional A/D converted 530. When the user has observed a display 1150 (of FIG. 11) indicating a tire pressure measurement relative to one or more thresholds, then the user may turn off remote RF source 500. The current will no longer be supplied to processor 510, which will then return to an inactive state.

Figure 6:
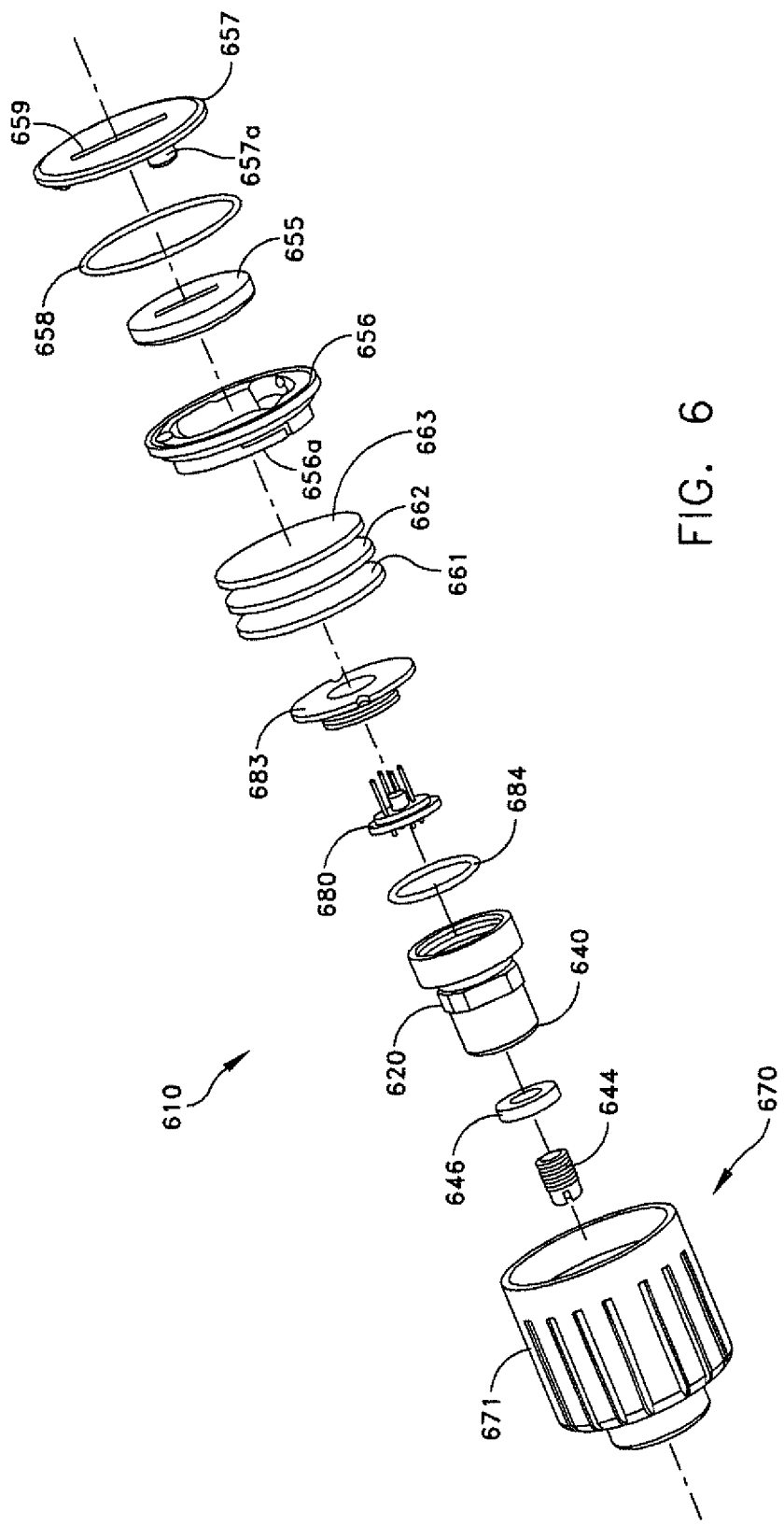
FIG. 6 is an exploded view of a tire pressure gauge in accordance with an alternative embodiment of the invention.

Referring now to FIG. 6, tire pressure gauge 610 is depicted in an exploded view. Tire pressure gauge 610 is generally similar to tire pressure gauge 410 illustrated in FIG. 4A. However, tire pressure gauge 610 has as a power source battery 655 adapted to be removed and replaced easily. In particular, tire pressure gauge 610 includes a battery compartment 656 having a lid 657 which may be removed and replaced readily, and particularly by rotating. Lid 657 is generally a solid cylinder, and has a latch at 657a, which mates with a protrusion at 656a. By placing a flat object, such as a coin or screwdriver blade, into a slot 659 in lid 657, the user may turn lid 657 sufficiently to disengage latch 657a from protrusion 656a, and thereby remove lid 657 and remove and replace battery 655. O-ring 658 may be provided to prevent moisture from entering the interior of battery compartment 656. Outer housing 670 may be substantially cylindrical, and may have two pieces, namely a body portion 671 open at both ends and battery compartment 656 that closes a distal opening of body portion 671.

Inner housing 620 defines a chamber having an opening, when tire gauge 610 is fully assembled, only at port 640, and is otherwise sealed. Port 640 is adapted to engage with and open the needle valve on a suitable tire valve stem. Port 640 has a threaded boss (not shown) adapted to sealingly engage with a threaded tire valve stem. Piston 644 fits within the threaded boss and is adapted to open a needle valve on a valve stem when port 640 is in sealing engagement with a suitable valve stem. Washer 646 may be provided to assist in sealing port 640 to a valve stem. PCBs 661, 662, 663 are mounted exterior to the chamber and within outer housing 670, and may carry thereon devices such as an RF antenna or other wake up circuit components, a processor and memory. A pressure sensing die 680 is positioned at an end of the chamber, and a bolt 683, with washer 684, seals the corresponding opening in inner housing 620. An advantage of the embodiment of FIG. 6 is that it may provide the device with a relatively significant power source, without the need to damage any permanent components to replace a battery.

Figure 7:
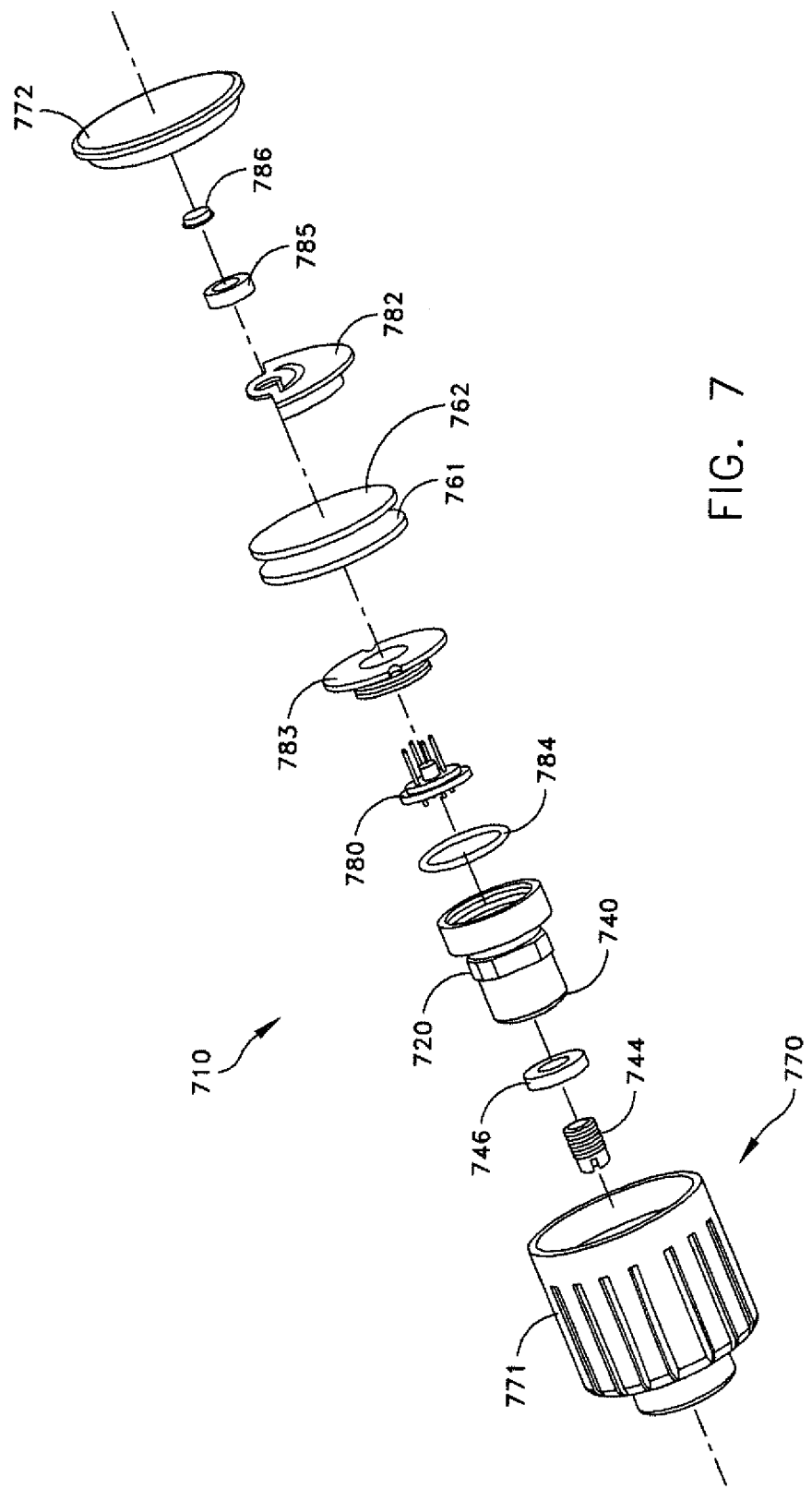
FIG. 7 is an exploded view of a tire pressure gauge in accordance with an alternative embodiment of the invention.

Referring now to FIG. 7, there is shown an exploded view of a tire pressure gauge 710 in accordance with an embodiment of the invention, in which relative internal motion of components as a result of motion of the device as the tire to which it is attached spins, is stored for later use, such as by being converted to a current and coupled to a battery or capacitor. It will be appreciated that devices that obtain energy from relative motion of internal components caused by motion of the device itself, are well-known. Self-winding watches store energy in this manner, by way of example, by use of an eccentric rotor coupled to a ratchet; motion of the ratchet winds a spring. Techniques applicable to self-winding watches may be applied to a tire pressure gauge in accordance with alternative embodiments of the invention.

In the embodiment of FIG. 7, an eccentric wheel 782 oscillates relative to the housing and other components. The depicted form of eccentric wheel 782 is merely exemplary, and, by way of example, other wheels or objects with unbalanced weight and mounted to rotate may be employed. Eccentric wheel 782 is rotatable on a mount (not shown). Bearing parts 785, 786 serve to cause eccentric wheel 782 to rotate in a plane with minimal friction. Eccentric wheel 782 has one or more permanent magnets (not shown) mounted thereon. One or more coils (not shown) may be mounted on PCB 762. A current is generated in the one or more coils when the one or more permanent magnets move, and the current may be employed to recharge one or more rechargeable batteries or capacitors (not shown), which may be mounted, by way of example, on one or more of PCBs 761, 762, or an inner surface of housing 770. Alternatively, eccentric wheel 782 may be coupled to a piece of piezo film, which, when is subject to stresses and/or strains as a result of the movement of eccentric wheel 782, provides a current to one or more rechargeable batteries or capacitors. Outer housing 770 may be substantially cylindrical, and may have two pieces, namely a body portion 771 open at both ends and a lid 772, which also supports eccentric wheel 782.

Inner housing 720 defines a chamber having an opening, when tire gauge 710 is fully assembled, only at a port 740, and is otherwise sealed. Port 740 is adapted to engage with and open the needle valve on a suitable tire valve stem. Port 740 has a threaded boss (not shown) adapted to sealingly engage with a threaded tire valve stem. A piston 744 fits within the threaded boss and is adapted to open a needle valve on a valve stem when port 740 is in sealing engagement with a suitable valve stem. A washer 746 may be provided to assist in sealing port 740 to a valve stem. PCBs 761, 762 are mounted exterior to the chamber and within outer housing 770, and may carry thereon devices such as an RF antenna or other wake up circuit components, a processor, memory, a battery, a motion sensor and/or a capacitor. A pressure sensing die 780 is positioned at an end of the chamber, and a bolt 783, with a washer 784, seals the corresponding opening in inner housing 720. An advantage of the embodiment of FIG. 7 is that it may provide the device with an internal source of power.

Figure 8:
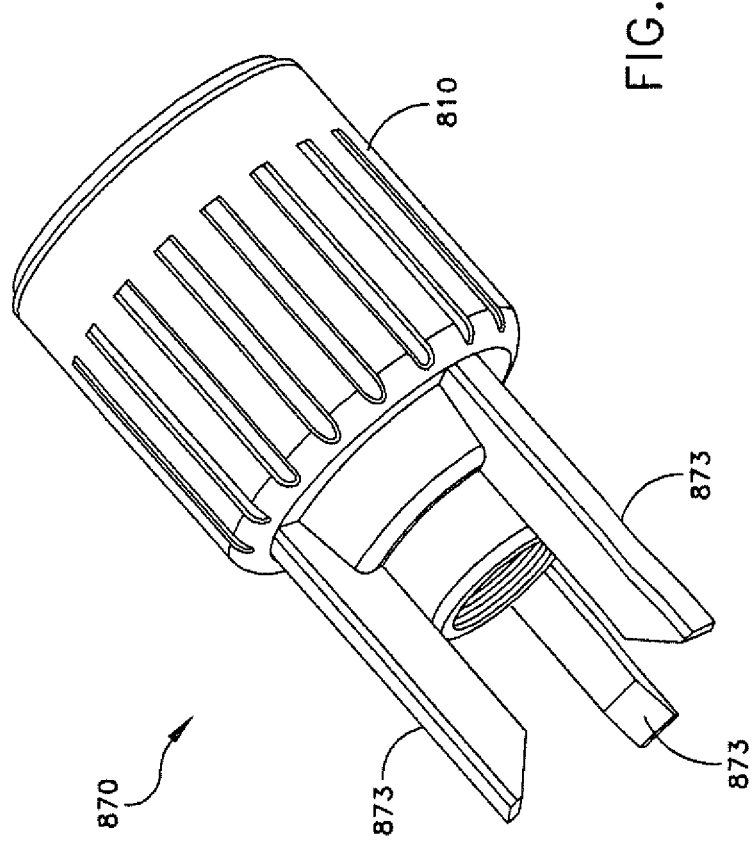
FIG. 8 is a view of an alternative embodiment of a tire pressure gauge outer housing in accordance with the invention.

Referring now to FIG. 8, an embodiment of a cap pressure gauge 870 is shown. In the illustrated embodiment, a plurality of fingers 873 extend from cap gauge 870 and are adapted to engage the sides of a valve stem when the device is engaged with a valve stem. Fingers 873 preferably are adapted to engage sides of a valve stem under tension. Fingers 873 serve to provide additional stability to tire pressure gauge 870 in accordance with an embodiment of the invention. While three fingers 873 are shown, the fingers may take any desired shape, and any form of extension that provides tension on substantially opposite sides of cap 870 would assist in stabilizing the device. It will be appreciated that one or more of fingers 873 may be hollow and enclose components of a tire pressure gauge.

Figure 9:
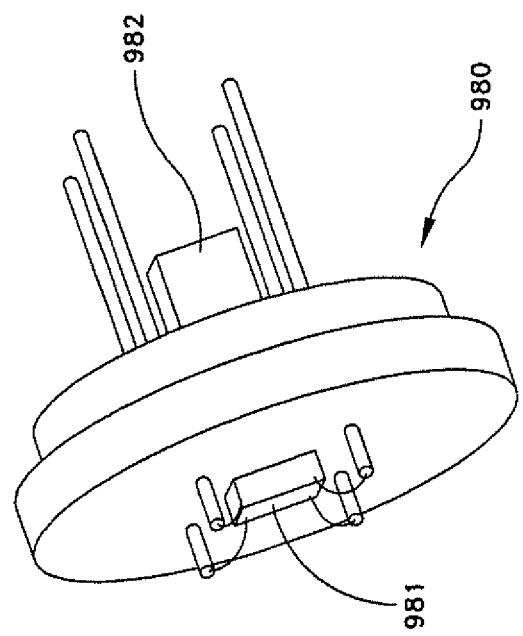
FIG. 9 is a view of an alternative embodiment of a pressure module in accordance with the invention.

Referring now to FIG. 9, there is shown an embodiment of a pressure sensing module 980, with an additional sensor, such as a pressure sensing die or a temperature sensor, provided. In this embodiment, module 980 has a pressure sensing die 981 on the side facing an interior chamber and corresponding electrical connections, so that pressure sensing die 981 provides a signal indicative of a a level of fluid pressure detected in the chamber. On the opposite side of module 980, there is provided a second pressure sensing die 982. Pressure sensing die 982 may be employed in conjunction with pressure sensing die 981 to obtain a relative pressure. Temperature readings may also be obtained if additional sensor 982 takes the form of a temperature sensor. Alternatively, a single die with multiple sensors may be provided. Multiple sensor dies may be provided for the purpose of offset compensation, as will be appreciated by those of skill in the art.

Figure 10:
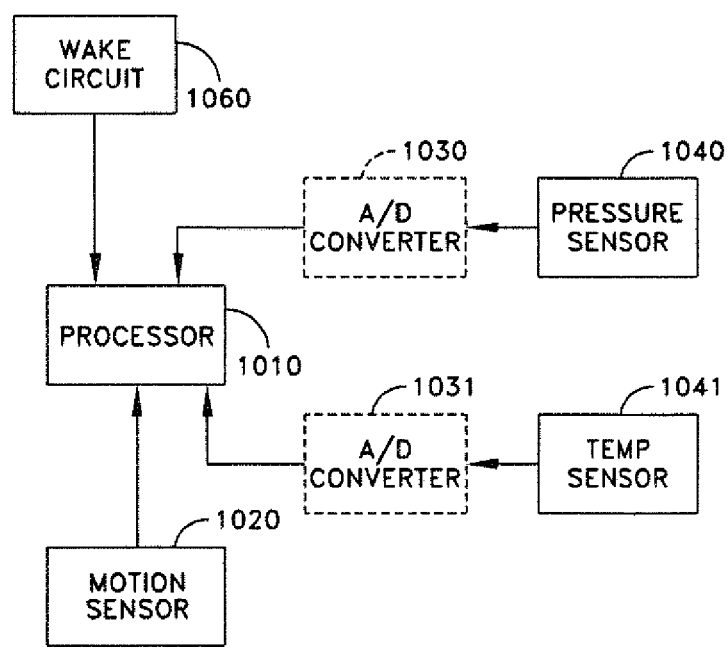
FIG. 10 is a block diagram of an alternative embodiment of a tire pressure gauge according to the invention.

Referring now to FIG. 10, there is shown a block diagram of an embodiment of a tire pressure gauge having a pressure sensor 1040, a temperature sensor 1041, as well as a motion sensor 1020. Processor 1010, wake circuit 1060, pressure sensor 1040 and optional A/D converter 1030 may be the same as those discussed above in connection with FIG. 3. Temperature sensor 1041 provides an output signal indicative of a temperature of the air in the chamber, and thus indicative of the air temperature in the tire. Temperature sensor outputs its signal to optional A/D converter 1031, which provides the digitized signal to processor 1010.

Figure 11:
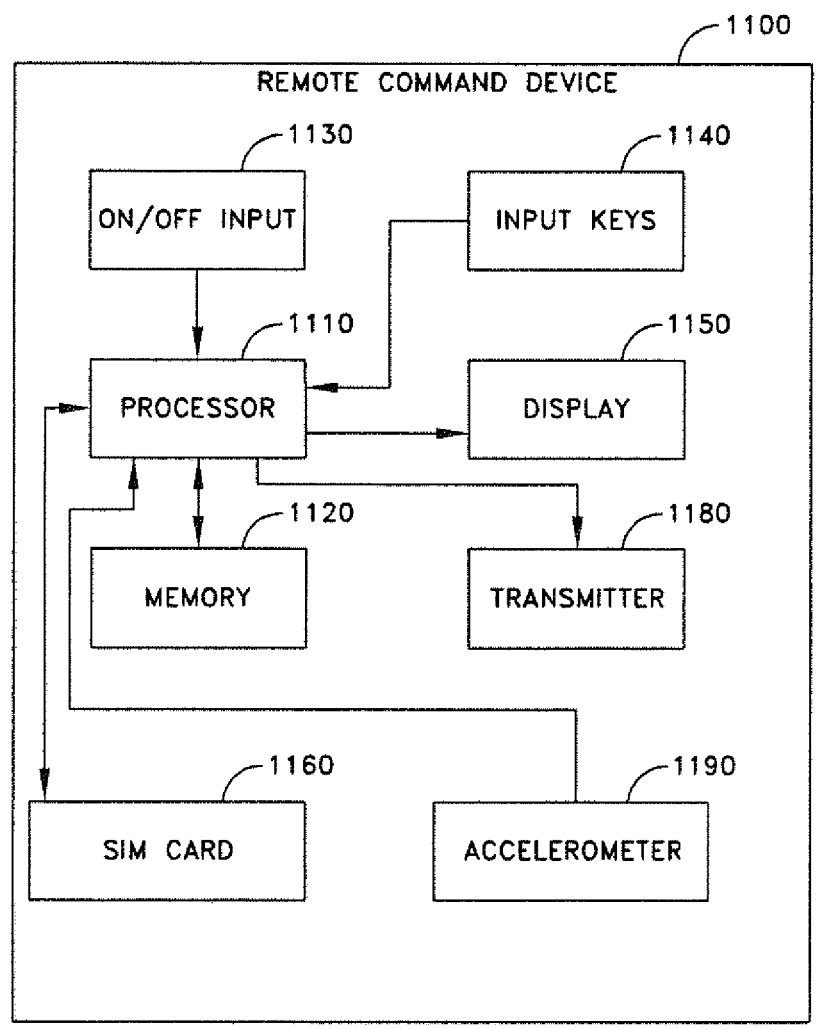
FIG. 11 is a block diagram of an embodiment of a remote control unit according to the invention.

Referring now to FIG. 11, there is shown a block diagram of a remote command device 1100 which may be employed with a tire pressure gauge described herein to cause a value to be displayed and to store threshold values in, for example, memory 1120. Remote command device 1100 has a processor 1110, which may be, by way of non-limiting example, a microprocessor. Memory 1120 of remote command device 1100 may be internal or external to processor 1110 and may take the form of one or more random-access memory (RAM), read-only memory (ROM), programmable read-only memory (PROM), erasable programmable read-only memory (EPROM), or electrically erasable programmable read-only memory (EEPROM) chips, by way of non-limiting example only. An on/off input 1130 may include a user-operable on/off switch and a circuit to provide a wake signal to processor 1110 when a user operates the on/off switch 1130 to activate device 1100. Input keys 1140 are user-operable and provide inputs to processor 1110. By way of non-limiting example, input keys 1140 may include "up" and "down" keys for scrolling through menus, and a "select" key for selecting a displayed and highlighted or otherwise designated menu item. Alphanumeric display 1150 may include text, numbers and/or graphic symbols, and may be, by way of example, an LCD display, with or without lighting.

Transmitter 1180 may be a radiofrequency transmitter that can transmit data, or may use another form of wireless transmission. Remote command device 1100 may be a handheld device contained in a housing convenient to hold in the hand, and may have an internal source of power, such as a battery. Remote command device 1100 may also have an illumination source, such as a "white" LED, or an incandescent lamp with reflector, to provide illumination. Remote command device 1100 further includes a removable Subscriber Identity Module (SIM) card 1160, according to an embodiment of the invention. It will be understood that while the exemplary embodiment uses a SIM card operable on a Global System for Mobile communication (GSM) networks, other embodiments may use different cards such as Removable User Identity Module (R-UIM) card, operable on other mobile telephone networks, such as Code Division Multiple Access (CDMA) networks, Universal Mobile Telecommunication Systems (UMTS), or other cards operative on other wireless networks such as Wireless Fidelity (Wi-Fi) and Worldwide Interoperability for Microwave Access (Wimax), by way of non-limiting examples only. Thus, further reference to SIM card is only for the sake of simplicity, and should be construed to include any other kind of removable cards operable on a mobile telephone network and/or other wireless networks. Device 1100 further includes an accelerometer 1190 for sensing an acceleration of the vehicle above a pre-set threshold, for example, as experienced during a collision.

Figure 12:
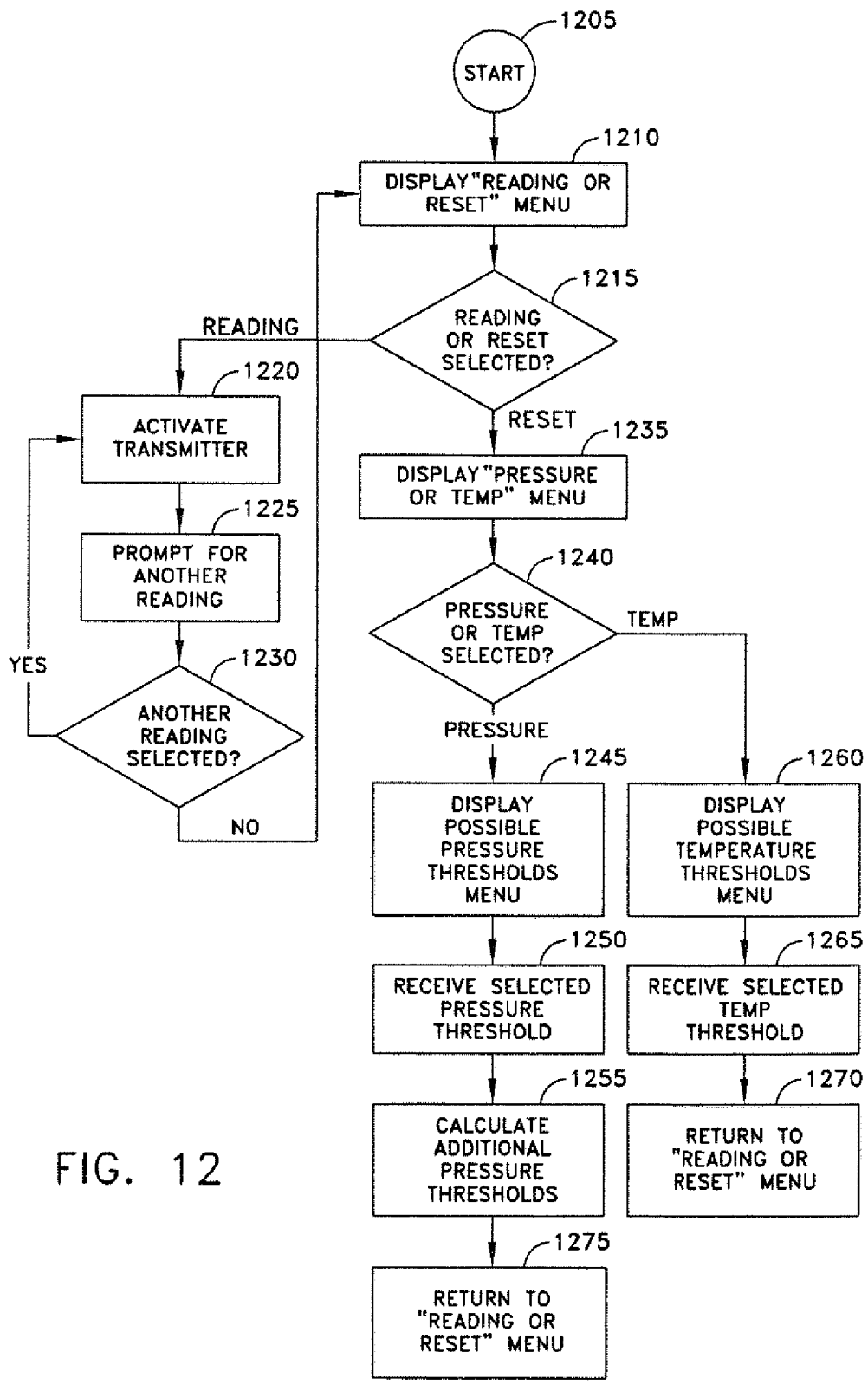
FIG. 12 is a process flow diagram of a process performed by a remote control unit of FIG. 15.

Referring now to FIG. 12, there is shown a process flow for a method of operating remote command device 1100 of FIG. 11. Initially, after the user presses on/off input switch 1130, a wake signal may be sent to processor 1110, and processor 1110 enters an active state, as indicated generally by block 1205. As indicated at block 1210, processor 1110 may cause display 1150 to display a menu providing a user a choice of taking a reading, such as a temperature and/or pressure reading from a tire pressure gauge, or resetting thresholds. The user may select a choice, by initially moving up and down buttons to highlight a selection, or to position an indicator adjacent the selection, and then press the "select" button of input keys 1140. As indicated at blocks 1215 and 1220, upon receiving a signal that a reading has been selected, processor 1110 activates transmitter 1160, which provides radiation and/or a signal to activate a tire pressure gauge 410 to provide an output. After activating transmitter 1160, processor 1110 causes display 1150 to prompt the user for another reading, as indicated at block 1225. If a selection of another reading is received, then the process flow returns to activating the transmitter again, as indicated at block 1230. If no selection of another reading is made within a selected time, then the process flow may return to the reading or reset menu.

If "reset" has been selected, then, as indicated at block 1235, processor 1110 may cause a "pressure or temp" menu to be displayed on display 1150, which enables a user to select changing thresholds for either pressure or temperature. If the user selects "pressure," then processor 1110 may cause a listing of possible recommended pressures to be displayed. The display may also include an instruction to the user to select the pressure recommended in an owner's manual or on a placard on the vehicle. When the user selects one of the listed recommended pressures, the pressure is received by the processor, as indicated by block 1250. Additional pressure thresholds may then be calculated in accordance with an algorithm stored in memory 1120. By way of non-limiting example, the algorithm may call for the calculation of a pressure threshold five percent below the recommended threshold, and for calculation of a second pressure threshold ten percent below the recommended threshold. Processor 1110 causes these new values to be stored in the appropriate memory locations, such as memory 1120. It will also be appreciated that additional menus may be provided for users to select additional threshold values directly, rather than having those values calculated. Once the pressure thresholds are calculated and/or stored, the process flow may return to the display of the "Reading or Reset" menu, as indicated at block 1275.

A similar process flow may be followed if the user selects "temp" when the "pressure or temp" menu is selected. Referring to block 1260 on FIG. 12, after processor 1110 receives a selection of "temp," processor 1110 may cause a listing of possible temperatures to be displayed. The processor receives a user selection of one of the listed temperatures, as indicated by block 1265. In the gauge, substantially the process described above with respect to receiving and storing new pressure thresholds is followed. After the step of selection, processor 1110 may display the "reading or reset" menu again, as indicated by block 1280.

Figures 13A, 13B:
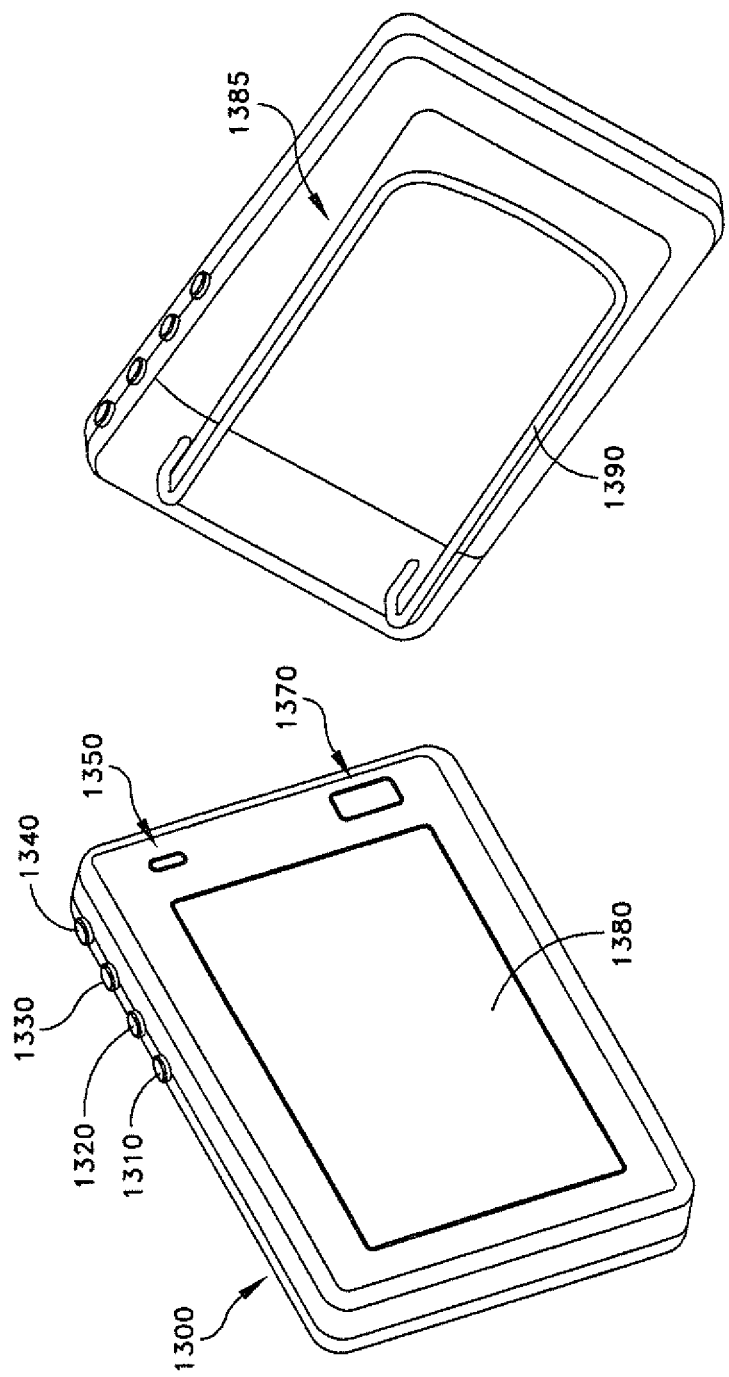
FIG. 13A is a front view of a remote control unit according to an embodiment of the invention.
FIG. 13B is a rear view of the remote control unit of FIG. 13A, according to an embodiment of the invention.

Referring now to FIGS. 13A and 13B, an exemplary embodiment of a remote command device 1300 is illustrated. In the illustrated embodiment, device 1300 has four buttons 1310, 1320, 1330, 1340. It will be appreciated that other embodiments of device 1300 may have more than or less than four buttons. In an exemplary embodiment, button 1310 is a "MODE" button, button 1320 is an "UP" button, button 1330 is a "DOWN" button, and button 1340 is a "SET" button. It will be appreciated that other arrangements and functions of buttons are also contemplated to be within the scope of the invention. Device 1300 includes an indicator 1350 which indicates the status of device 1300. In an exemplary embodiment, indicator 1350 is a LED which lights on when the device 1300 is on. Other embodiments may have other kinds of status indicators. Device 1300 also includes a "Recall button" 1370. In an exemplary embodiment, recall button 1370 is used to recall prior stored tire pressure measurement. Also illustrated, in FIG. 13B, are a battery cover 1385 and a visor clip 1390. In the illustrated embodiment, visor clip 1390 is a generally U-shaped wire frame. It will be appreciated that other types of visor clips are also contemplated to be within the scope of the invention. Command device 1300 may be removably mounted to a visor in an automobile compartment. Device 1300 so mounted on a visor is thus easily visible to a user in the automobile.

Figure 14:
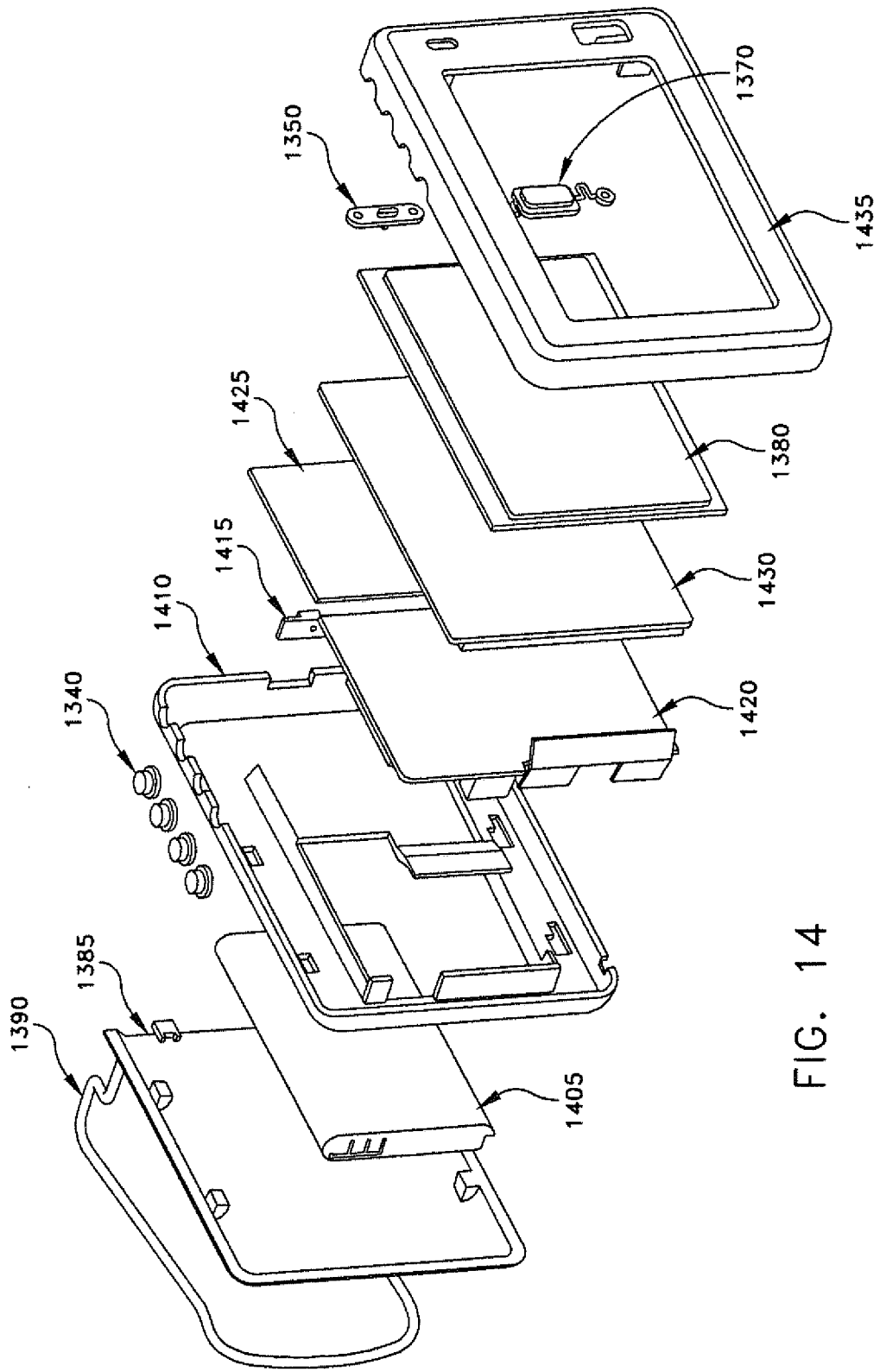
FIG. 14 is an exploded view of the remote control unit of FIG. 13A, according to an embodiment of the invention.

Referring now to FIG. 14, there is shown an exploded view of an exemplary embodiment of device 1300. Device 1300 includes a top cover 1435 and a bottom cover 1410. Printed circuit boards (PCB) 1420, 1425 are positioned between top cover 1435 and bottom cover 1410. In an exemplary embodiment, PCB 1420 is a Radio Frequency (RF) PCB whereas PCB 1425 is a GSM PCB. Device 1300 further includes a display 1380 disposed between top cover 1435 and bottom cover 1410. In an exemplary embodiment, display 1380 a Liquid Crystal Display (LCD). Other embodiments may include other types of displays. Display 1380 is covered by a lens 1430. A battery 1405 is located on bottom cover 1410. Battery 1405 is covered by a battery cover 1385. An advantage of this arrangement is that battery cover 1385 may be removed to replace battery 1405 without disturbing the components positioned within top cover 1435 and bottom cover 1410.

Figure 15A:
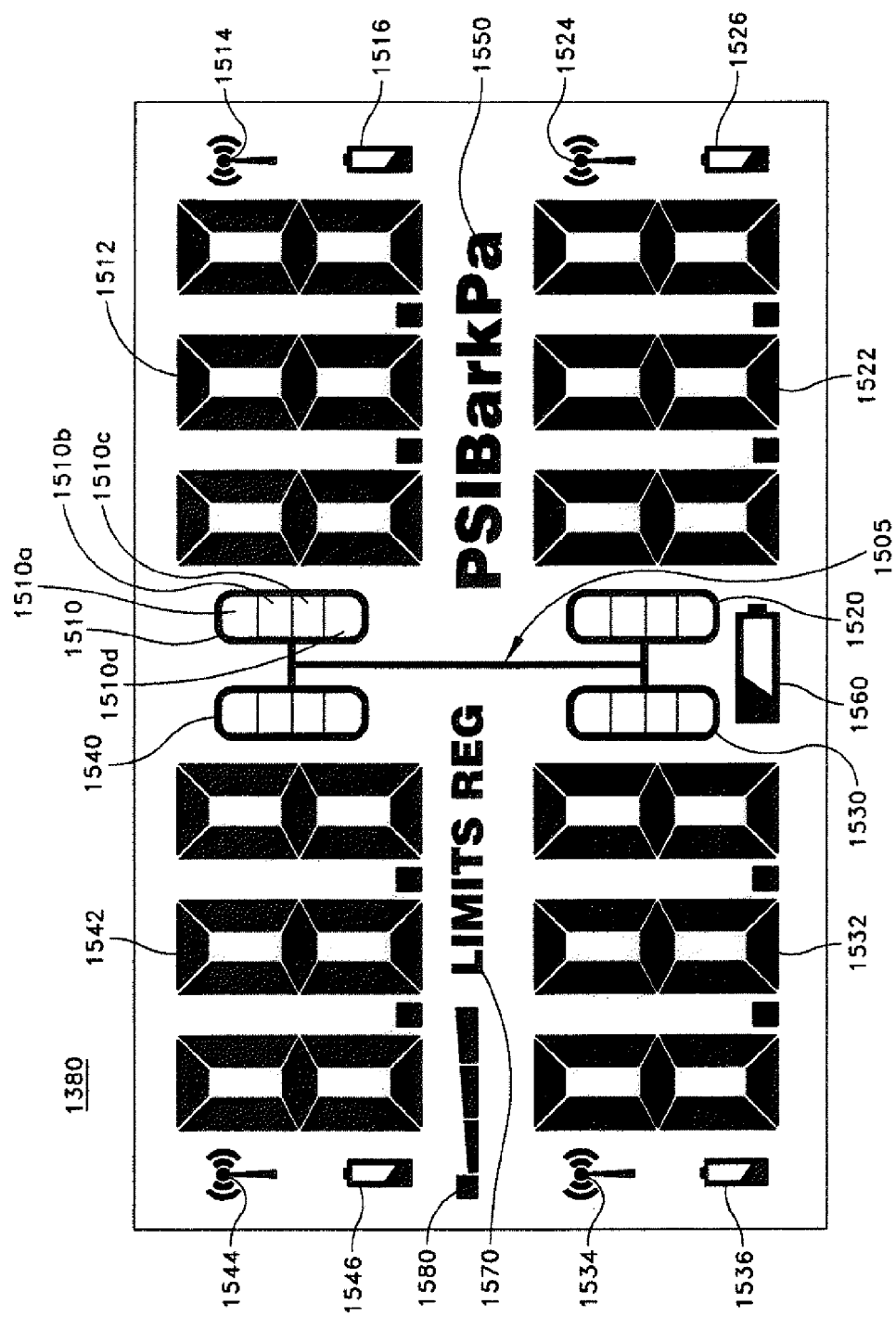
FIG. 15A is a layout of the LCD display of the remote control unit of FIG. 13A, according to an embodiment of the invention.

Referring now to FIG. 15A, an exemplary layout of display 1380 is illustrated. Stick figure 1505 schematically represents an automobile with four tires. In the illustrated embodiment, symbol or block 1510 represents front passenger tire, block 1520 represents rear passenger tire, block 1530 represents rear driver tire and block 1540 represents front driver tire. Block 1510 is divided into four segments or parts 1510a, 1510b, 1510c, 1510d. In the illustrated embodiment, each of four parts 1510a, 1510b, 1510c, 1510d is adapted to light up in a different color. For example, part 1510a is adapted to light up in red, part 1510b is adapted to light up in green, part 1510c is adapted to light up in yellow and part 1510d is adapted to light up in blue. It will be appreciated that in other embodiments, block 1510 may be divided into more than or less than four parts and that parts may light up in colors other than those described above. A text box 1512 is displayed adjacent to block 1510 and is adapted to display a tire pressure for front passenger tire in the illustrated embodiment. A graphic symbol 1514 is indicative of the strength of RF signal received from a tire pressure gauge 10 (of FIG. 1) associated with the front passenger tire. Similarly, a graphic symbol 1516 is indicative of the battery status of battery 860 (of FIG. 5) of tire pressure gauge 10 (of FIG. 1) associated with the front passenger tire. Likewise, graphic symbols 1524, 1534, 1544 are indicative of the strength of RF signals received from tire pressure gauges 10 (of FIG. 1) associated with the rear passenger tire, the rear driver tire and the front driver tire respectively and graphic symbols 1526, 1536, 1546 are indicative of the battery status of battery 860 (of FIG. 5) of tire pressure gauge 10 (of FIG. 1) associated with the rear passenger tire, the rear driver tire, and the front driver tire respectively.

In the illustrated embodiment, a text box 1550 is adapted to display various units of pressure. By way of non-limiting example only, text box 1550 is adapted to display one of "PSI," "Bar," and "kPa," depending on the selection by a user. A graphic symbol 1560 is indicative of the strength of battery 1405 (of FIG. 14A). A graphic symbol 1580 is indicative of the strength of a wireless signal. In the illustrated embodiment, symbol 1580 is indicative of the strength of a GSM network. Display 1380 further includes a text box 1570. In the illustrated embodiment, text box 1570 is adapted to display either "Limits" when the user has selected setting mode to set tire pressure limits or "Reg" when device 1300 is in the process of registering tire pressure gauges 10 associated with the tires of an automobile. In other embodiment, text box 1570 may be adapted to display other messages for the user.

Figure 15B:
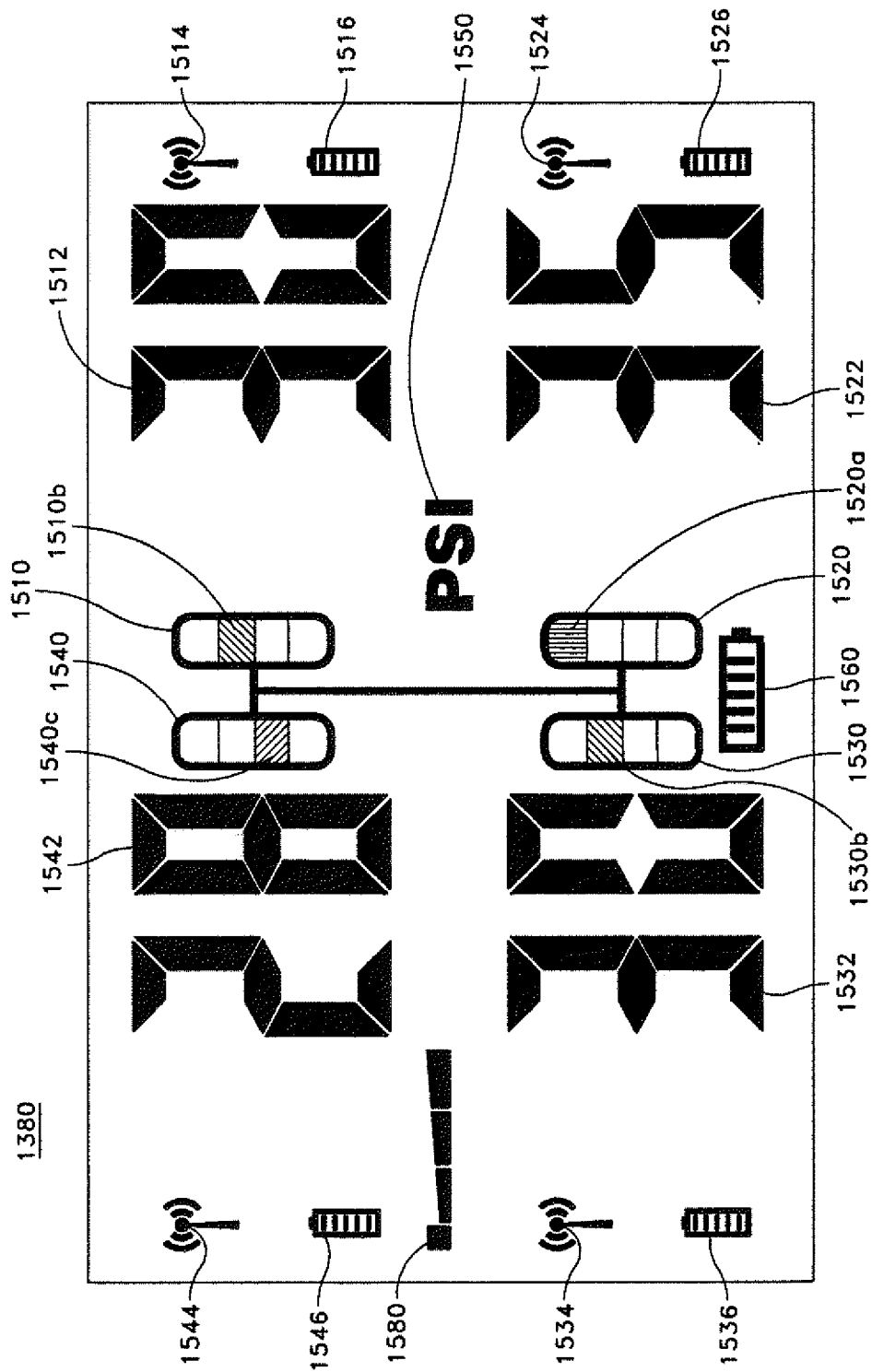
FIG. 15B is an exemplary view of LCD display of the remote control unit of FIG. 13A, according to an embodiment of the invention.

Referring now to FIG. 15B, an exemplary display 1380 is illustrated wherein tire pressure thresholds have been pre-set by the user and device 1300 displays the tire pressure measurements received from tire pressure gauges 10 (of FIG. 1) associated with the four tires of the automobile. Textbox 1550 indicates that the displayed pressure measurements are in PSI units. Textbox 1512 indicates that the front passenger tire pressure is 30 PSI; textbox 1522 indicates that the rear passenger tire pressure is 35 PSI; textbox 1532 indicates that the rear driver tire pressure is 30 PSI and textbox 1542 indicates that the front driver tire pressure is 28 PSI. In the exemplary embodiment, pressure threshold for all four tires is 30 PSI, for illustrative purpose only. It will be appreciated that a user is free to set different pressure threshold values for different tires. Graphic symbols 1514, 1524, 1534, 1544 indicate that all four tire pressure gauges 10 (of FIG. 1) associated with four respective tires are in RF communication with device 1300. Similarly, graphic symbols 1516, 1526, 1536, 1546 indicate that the batteries 860 (of FIG. 8) of all four tire pressure gauges 10 are fully charged. In the illustrated embodiment, parts 1510b, 1530b are lit in green color to indicate that the measured pressure values for respective front right side and rear left tires are equal to or within acceptable range of pre-set pressure threshold. Part 1540c is lit in yellow color in the illustrated embodiment to indicate that the front left tire is underinflated but not alarmingly so. Part 1520a is lit in red color to indicate that the rear right tire is over-inflated.

Figure 16A:
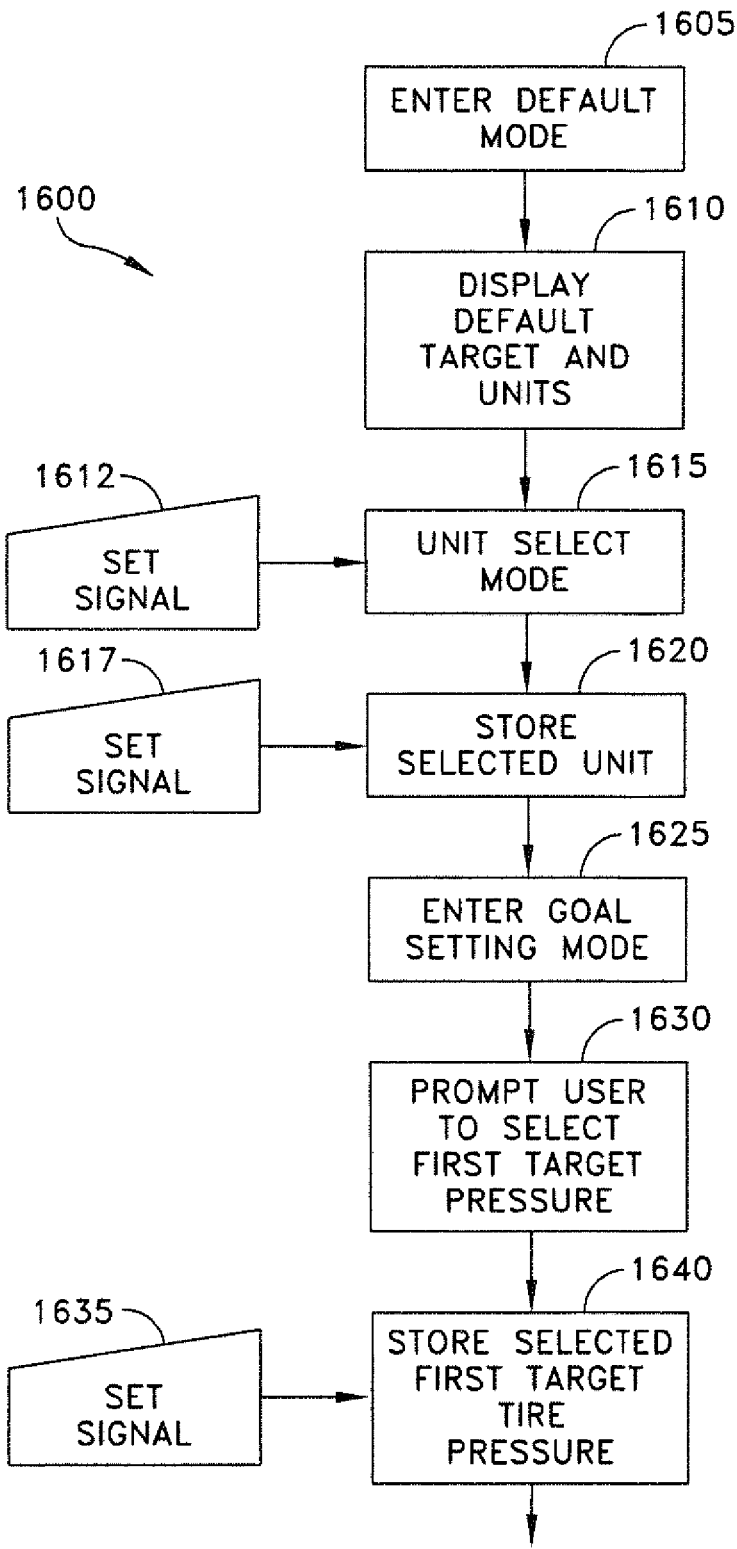
FIGS. 16A and 16B are a process flow diagram of certain steps of preparing a device of FIG. 13A for use.
Figure 16B:
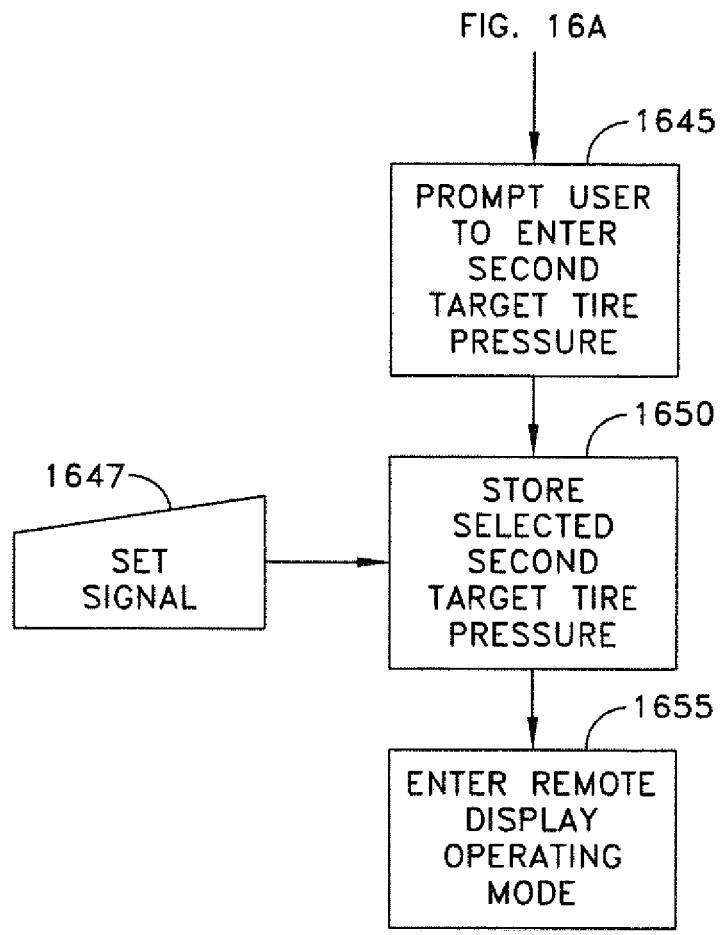

Referring now to FIGS. 16A and 16B, there is shown a block diagrammatic representation of a process 1600 according to an aspect of the present invention, and being suitable for use with device 1300 (of FIG. 13). In an initial step, indicated by block 1605, upon initially powering up of device 1300 (of FIG. 13), the device enters a default initial display mode. In the default mode, processor 1110 (of FIG. 11) accesses, such as from memory 1120 (of FIG. 11), a stored default target pressure, and a stored default unit, and causes that target and unit to be displayed, as indicated by block 1610.

In response to a SET signal, as indicated by block 1612, device 1300 enters a display unit select mode, as indicated by block 1615. In the display unit select mode, a unit will blink to prompt the user to select a unit. For example, initially, PSI may blink. In response to the user pressing the up and down keys, the unit that is blinking will change. In response to a further SET signal, the unit for display will be selected and stored in memory, as indicated by block 1617 and 1620, and the device will enter a goal setting mode, as indicated by block 1625.

In the goal setting mode, the user is prompted to enter a first target tire pressure, as indicated by block 1630. The first tire pressure may be for the front tires, for example. The prompting may take the form of causing the emitters corresponding to a set of wheels, such as the front wheels or the rear wheels, to blink. A default target tire pressure is displayed, and may be incremented up and down in response to pressing of the up and down buttons by the user. When a desired first target tire pressure is displayed, the user may press the SET button. This will generate a SET signal, indicated by block 1635, to the processor 1110 (of FIG. 11), which will then store, as indicated by block 1640, the then-displayed value as the first target tire pressure in memory 1120 (of FIG. 11).

Referring now to FIG. 16B, processor 1110 (of FIG. 11) may then prompt the user to enter a second target tire pressure, as indicated by block 1645. The second target tire pressure may be for the rear tires. The prompting may take the form of causing the emitters corresponding to the blocks or emitters corresponding to the rear wheels to blink. A default second target tire pressure may be displayed. The displayed second target tire pressure may be incremented up and down in response to pressing of the up and down buttons by the user. When a desired second target tire pressure is displayed, the user may press the SET button, as indicated by block 1647. In response, processor 1110 (of FIG. 11) will cause the then-displayed second target tire pressure to be stored in memory, as indicated by block 1650. Device 1300 will then enter the remote display operating mode.

In an exemplary embodiment, four tire pressure gauges 10 (of FIG. 1) are pre-registered with remote command device 1300. For example, a first tire pressure gauge 10 is labeled "FL" to indicate front left, a second tire pressure gauge 10 is labeled "FR" to indicate front right, a third tire pressure gauge is labeled "RL" to indicate rear left, and a fourth tire pressure gauge is labeled "RR" to indicate rear right. The user mounts these four tire pressure gauges 10 respectively on the valve stems of the front left tire, the front right tire, the rear left tire and the rear right tire. In other embodiments, a manual registration process may be used to register tire pressure gauges 10 with remote command device 1300, as described below.

Figure 17:
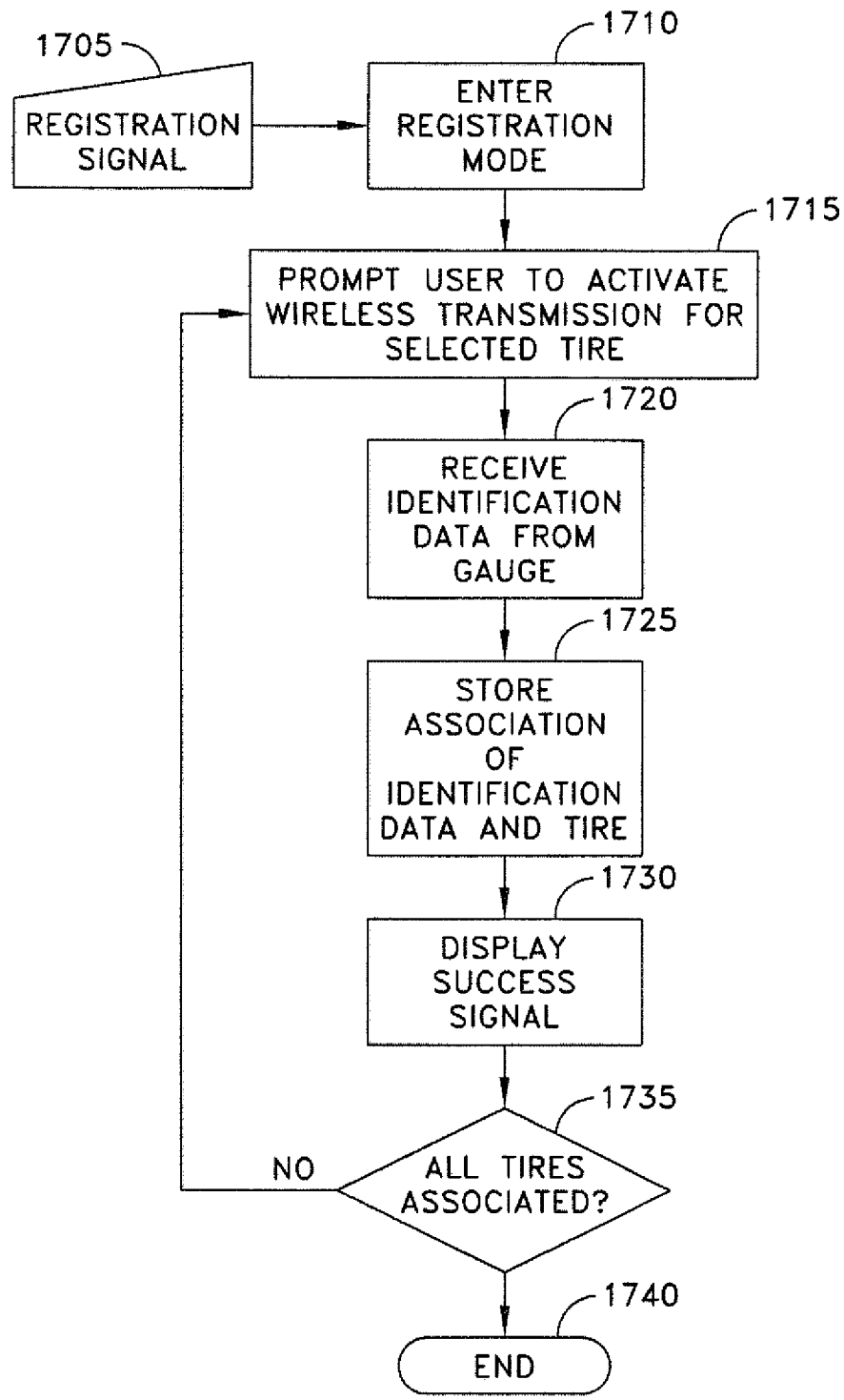
FIG. 17 is a process flow diagram of a process for registration of valve cap mounted tire pressure gauges with a remote command device, according to an embodiment of the invention.

A process flow for manual registration of valve cap mounted tire pressure sensors and transmitters with device 1300 will be described with reference to FIG. 17. In an exemplary embodiment, the user removes all batteries 655 (of FIG. 6) of all tire pressure gauges 10 and battery 1405 (of FIG. 14) of remote command device 1300. The user then installs battery 1405 in remote command device 1300. A user causes a registration signal, as indicated by block 1705 to be sent to processor 1110 (of FIG. 11), such as by pressing a registration key, which may be recessed in any suitable location, so that it is not inadvertently pressed during normal use. In response, device 1300 enters registration mode, as indicated by block 1710.

Device 1300 prompts the user to activate a wireless transmission from the valve-stem mounted tire pressure gauge mounted on a particular tire, as indicated by block 1715, which transmission includes at least tire pressure gauge identification information. The prompting may include "blinking" an emitter associated with the particular tire. The identification information may be an alphanumeric sequence, which sequence is different at least for each tire pressure gauge on a particular vehicle that is stored in a memory of the valve-stem mounted tire pressure gauge. The user then installs battery 655 (of FIG. 6) in a first tire pressure gauge 10 (of FIG. 1).

The user may then cause the valve-stem mounted tire pressure gauge to emit a signal by attaching the gauge to a valve stem; in response to detecting an increase in pressure of, for example, over a threshold of 30% between readings, the gauge emits a signal continuously for 3 seconds, and then repeats the signal again after an interval, such as 15 seconds. This signal includes an identification for the gauge. When the identification is received, as indicated by block 1720, processor stores the identification and an association between the identification and a particular tire, as indicated by block 1725. When the processor has completed storing this information, the processor may cause a success signal to be displayed, as indicated by block 1730. For example, the success signal may include blinking the emitter associated with the particular tire a selected number of times in a color different from the color of the prompting signal. For example, the success signal may include blinking the emitter in green three times.

If not all of the tires have an associated identification stored in memory, then, as indicated by block 1735, the processor may then prompt the user to cause another one of the gauges to emit an identification signal. The user then installs batteries 655 (of FIG. 6) in respective pressure gauges 10 (of FIG. 1) and mounts them on respective tires. The process is then repeated until an identification is associated with each tire in memory 1120 (of FIG. 11), and then the registration process ends, as indicated by block 1740.

Figure 18:
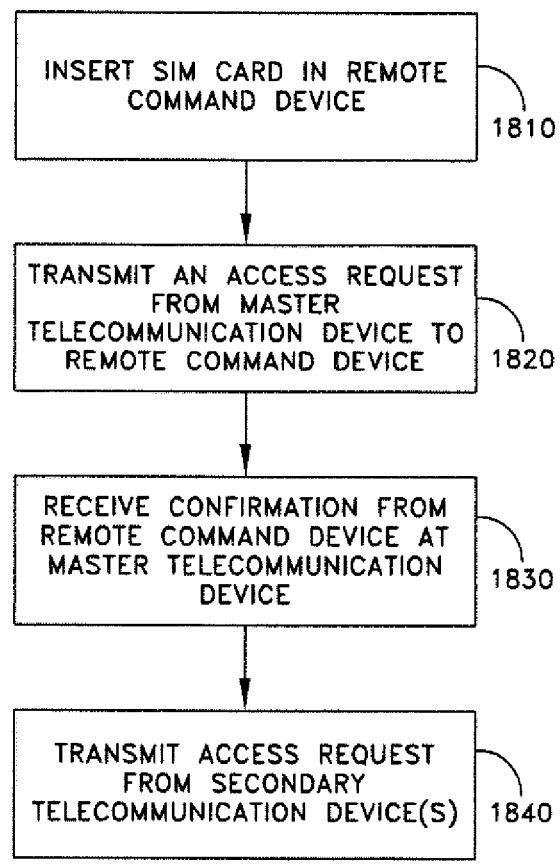
FIG. 18 is a process flow diagram of a process for registration of telecommunication devices with the remote command device.

Referring now to FIG. 18, there is illustrated a process flow for registering a telecommunication device with remote command device 1300. By way of non-limiting example only, the telecommunication device may take the form of a cellular telephone. At block 1810, a SIM Card is inserted in remote command device 1300. A user transmits an access request from the telecommunication device to remote command device 1300, at block 1820. In an exemplary embodiment, the access request is in the form of a Short Message Service (SMS) text message and includes a factory-set access code. The first telecommunication device that transmits a request access to remote command device 1300 is identified and registered as the master telecommunication device. Responsive to the access request, remote command device transmits a confirmation message to the master telecommunication device, at block 1830. In an exemplary embodiment, remote command device 1300 requests the user to change the factory-set access code to a personalized access code. The user may then optionally register one or more secondary telecommunication devices with remote command device 1300, at block 1840. In an exemplary embodiment, two secondary telecommunication devices may be registered with remote command device 1300. In other embodiments, more than or less than two secondary telecommunication devices may be registered with remote command device 1300. In an exemplary embodiment, only the master telecommunication device may be used to transmit a control signal, for example, to change access code to remote command device 1300 or to delete a secondary telecommunication device from the register of remote command device 1300, whereas the secondary telecommunication devices may be used only to request information and to receive alerts from the remote command device. Remote command device 1300 responds to control signals only from the master telecommunication device. Registered telecommunication devices may be unregistered by transmitting a request, for example, "DELETE" from the telecommunication device to remote command device 1300. Remote command device 1300 may optionally include a "Reset" button. When such a "Reset" button is activated, the registration information is deleted and the access code is reset to the factory-set access code in the even the user forgets the personalized access code.

Figure 19:
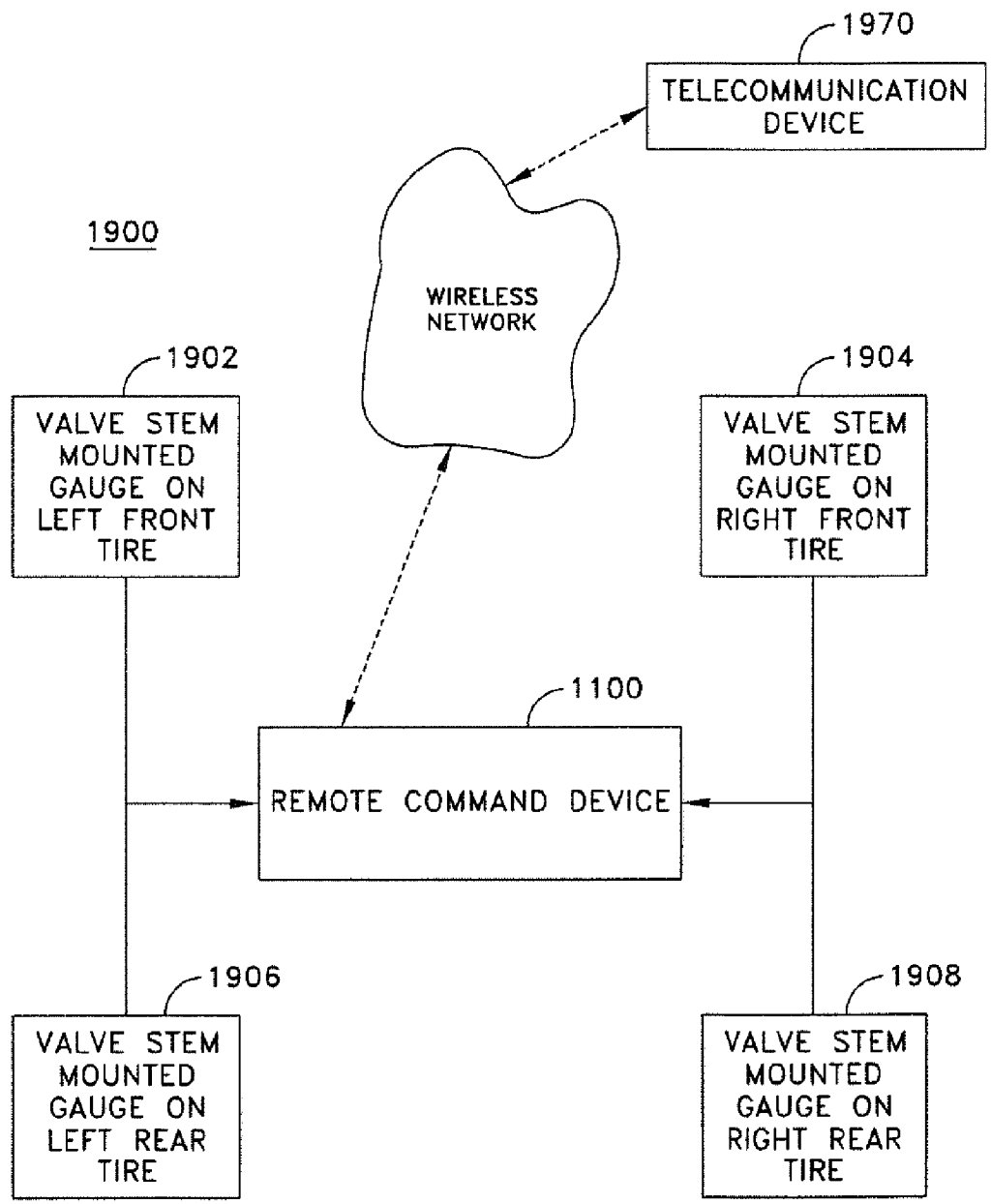
FIG. 19 is a block diagram of a system for detecting and displaying tire pressure data.

Referring to FIG. 19, in an embodiment, a system 1900 for detecting and displaying and remote monitoring vehicle tire pressure is shown schematically. Remote command device 1300 receives via wireless communication identification data, tire pressure data, motion sensor data and possibly other data, such as low battery indication data, from valve cap mounted tire pressure gauges with wireless transmitters. In the exemplary system 1900, for a vehicle with four tires, valve cap mounted tire pressure gauge 1902 is on a valve stem of a left front tire, valve cap mounted tire pressure gauge 1904 is a on a valve stem of a right front tire, valve cap mounted tire pressure gauge 1906 is on a valve stem of a left rear tire, and valve cap mounted tire pressure gauge 1908 is on a valve stem of a right rear tire. Valve cap mounted tire pressure gauges 1902, 1904, 1906, 1908 may be identical to gauge 800, by way of non-limiting example.

The valve cap mounted tire pressure gauges may be similar to those depicted in FIG. 9 of the commonly owned U.S. patent application Ser. No. 11/589,329, filed Oct. 27, 2006, now U.S. Pat. No. 7,667,583, which application is incorporated by reference in its entirety. Those tire pressure gauges include as a power source a battery adapted to be removed and replaced easily. In particular, such a tire pressure gauge includes a battery compartment having a lid which may be removed and replaced readily, and particularly by rotating. The lid is generally a solid cylinder, and has a latch, which mates with a protrusion. By placing a flat object, such as a coin or screwdriver blade, into a slot provided in the lid, the user may turn the lid sufficiently to disengage the latch from the protrusion, and thereby remove the lid and remove and replace the battery. An O-ring may be provided to prevent moisture from entering the interior of battery compartment. The valve-stem mounted tire pressure gauges include an RF emitter.

Remote command device 1300 is in wireless communication with a telecommunication device 1970 via a wireless network and SIM card 1160 (of FIG. 11). In an exemplary embodiment, device 1300 is adapted to receive a query from a telecommunication device 1970 (of FIG. 19) operating on. GSM network. Responsive to the query, device 1300 transmits the requested information, for example, tire pressures and/or temperatures measured by pressure sensor 1040 (of FIG. 10) and temperature sensor 1041 (of FIG. 10) respectively, to telecommunication device 1970. In another embodiment, device 1300 may be configured to transmit a preset set of information such as tire pressures and/or temperatures measured by pressure sensor 1040 (of FIG. 10), temperature sensor 1041 (of FIG. 10) to telecommunication device 1970 (of FIG. 19) at a preset time, such as when remote control device 1300 is turned on or a preset intervals of time, such as every twenty-four hours. In an exemplary embodiment, telecommunication device may be a mobile telephone, a smart phone, a wireless personal digital assistant (PDA), and other such wireless devices adapted to communicate over GSM network. It will, of course, be appreciated that the use of term "GSM" network is for illustrative purposes only and is intended to include other wireless communication protocols as well. In an exemplary embodiment, telecommunication device 1970 sends a query to device 1300 in form a Short Message Service (SMS) or a text message. In an exemplary embodiment, device 1300 responds to the query in form of a SMS, which may include alphanumeric characters as well as graphical symbols.

In an exemplary embodiment, device 1300 is adapted to request for user authentication when device 1300 is turned on. The user authentication may be in form of a pin or a password. In an exemplary embodiment, device 1300 is adapted to transmit an alert to a pre-registered telecommunication device 1970 if motion sensor 320 (of FIG. 3) detects any motion of the tire associated with tire pressure gauge 410. Thus, device 1300 also acts as an anti-theft device. In an exemplary embodiment, remote command device 1300 also acts a collision alert, wherein device 1300 transmits an alert to a pre-registered telecommunication device, if accelerometer 1190 (of FIG. 11) detects acceleration above a pre-set threshold. If the tire pressure measurement from any of the four tires drops or increases beyond a pre-set pressure threshold, remote command device 1300 transmits an alert to the registered telecommunication device. For example, if the tire pressure measurement for left front tire is below 10% of the pre-set threshold, remote command device 1300 transmits an alert to one or more registered telecommunication devices, for example, "Your Front Left tire pressure is low; Pressure: 26.4 PSI; Please inflate your Front Left Tire."

It will be appreciated that each of the ports for coupling to and mounting to a valve stem of a vehicle tire may be adapted to mount on a valve stem by virtue of having interior threads which permits them to be screwed or threaded onto a valve stem. It will be appreciated that alternative structures may be included in the port for providing that the port is adapted to mount on a valve stem. The ports for coupling to and mounting on a valve stem may be adapted to couple to and mount on a valve stem with no modification to the valve stem.

Advantages of a device and method in accordance with the invention include permitting the user to determine whether a tire is underpressurized without the need to remove a tire valve stem cap and physically engage a tire pressure gauge with the tire valve stem cap. A further advantage is that a device in accordance with an embodiment of the invention is that such devices may be installed on vehicles with minimal effort and cost associated with installation. A further advantage of a device in accordance with some embodiments of the invention is that the user may provide the recommended tire pressure of the user's own vehicle to the device, thereby avoiding the need to have this pressure pre-stored when the device is manufactured. An advantage of an embodiment having both an active pressure sensor and a reference pressure sensor is that readings will be compensated for variations in temperature, for example, while the gauge remains on the valve stem. Additional advantages of embodiments of the invention will be evident to those of skill in the art.

While the foregoing invention has been described with reference to the above-described embodiment, various modifications and changes can be made without departing from the spirit of the invention. Accordingly, all such modifications and changes are considered to be within the scope of the appended claims.

What is claimed is:

1. A tire pressure monitoring system comprising:
a valve-stem mountable tire pressure gauge comprising:
    a pressure sensor adapted for detecting a pressure of a fluid in a tire, said pressure sensor providing an output signal indicative of the detected fluid pressure in the tire; and
    a first radio frequency module for transmitting data indicative of said detected fluid pressure based on said output signal of said pressure sensor; and
a remote command device comprising:
    a second radio frequency module adapted for wirelessly receiving the data transmitted by said first radio-frequency module;
    a wireless communication module adapted for communicating, via a wireless network, information based at least on the data received by said second radio frequency module;
    at least one of a Subscriber Identity Module (SIM), and a Removable User Identity Module (R-UIM); and
    a display for displaying at least the fluid pressure detected by said pressure sensor.

2. The system of claim 1, wherein said pressure gauge further comprises a motion sensor for detecting motion of the tire and providing an output signal indicative of the motion of the tire,
wherein said first radio frequency module is adapted to transmit data indicative of said detected tire motion based on said output signal of said motion sensor, and
wherein, responsive to the receipt of the data indicative of said detected tire motion at the second radio frequency module, said wireless communication module communicates, via the wireless network, information based on the tire motion data received by said second radio frequency module.

3. The system of claim 1, wherein said remote command device further comprises a memory for storing a plurality of values, said values comprising at least one of a target pressure value, a detected pressure value, a threshold pressure value, a threshold temperature value, and a detected temperature value, and
wherein said wireless communication module is adapted for communicating information via the wireless network, if a detected pressure value is less than the threshold pressure value or if a detected temperature value exceeds a threshold temperature value.

4. The system of claim 3, wherein said display is configured to display at least one graphical symbol representative of the tire associated with the pressure gauge, said symbol comprising a plurality of segments, wherein each segment is adapted to selectively illuminate depending on a relationship between the detected tire pressure and the threshold tire pressure value stored in said memory.

5. The system of claim 1, wherein said display is configured to display at least one numerical value indicative of at least one of a preset pressure value and a pressure detected by said pressure sensor.

6. The system of claim 1, wherein said wireless communication module is adapted for communicating via a GSM network.

7. A tire pressure monitoring system comprising:
a valve-stem mountable tire pressure gauge comprising:
    a pressure sensor adapted for detecting a pressure of a fluid in a tire, said pressure sensor providing an output signal indicative of the detected fluid pressure in the tire; and
    a first radio frequency module for transmitting data indicative of said detected fluid pressure based on said output signal of said pressure sensor; and
a remote command device comprising:
    a second radio frequency module adapted for wirelessly receiving the data transmitted by said first radio-frequency module;
    a wireless communication module adapted for communicating, via a wireless network, information based at least on the data received by said second radio frequency module; and a display for displaying at least the fluid pressure detected by said pressure sensor, wherein the remote command device is configured to wirelessly receive a communication from a telecommunication device via the wireless network, said communication indicative of the identity of said telecommunication device, and to register the telecommunication device as a master telecommunication device, wherein said remote command device is responsive to a control signal transmitted by only said master telecommunication device.

8. The system of claim 7, wherein said remote command device further comprises an accelerometer for sensing an acceleration and providing an output signal indicative of the sensed acceleration, and wherein said wireless communication module is adapted for communicating information indicative of said sensed acceleration based on said output signal of said accelerometer, if the sensed acceleration exceeds a preset threshold.

* * * * *